US007741555B2

(12) United States Patent
Onozawa

(10) Patent No.: US 7,741,555 B2
(45) Date of Patent: Jun. 22, 2010

(54) HYBRID WIND MUSICAL INSTRUMENT AND ELECTRIC SYSTEM FOR THE SAME

(75) Inventor: Naoyuki Onozawa, Shizuoka-Ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

(21) Appl. No.: 12/127,999

(22) Filed: May 28, 2008

(65) Prior Publication Data

US 2009/0019999 A1 Jan. 22, 2009

(30) Foreign Application Priority Data

Jul. 17, 2007 (JP) ............................. 2007-185562

(51) Int. Cl.
*H04Q 1/18* (2006.01)

(52) U.S. Cl. ............................. 84/653; 84/600; 84/658; 84/723; 84/742; 84/88; 84/337; 84/341

(58) Field of Classification Search ....................... None
See application file for complete search history.

(56) References Cited

U.S. PATENT DOCUMENTS

D145,890 S 11/1946 Gillespie
2,425,795 A 8/1947 Gillespie
2,474,836 A 7/1949 Gillespie
2,494,783 A 1/1950 Swihart
2,570,354 A 10/1951 Loney
2,971,423 A 2/1961 Leblanc
3,507,971 A 4/1970 Feddersen
3,657,464 A 4/1972 Pascussi
3,938,419 A 2/1976 De Rosa
4,342,244 A 8/1982 Perkins
4,527,456 A 7/1985 Perkins et al.
5,149,904 A 9/1992 Kamiya et al.
5,354,947 A 10/1994 Kunimoto et al.
5,668,340 A * 9/1997 Hashizume et al. ........... 84/742

(Continued)

FOREIGN PATENT DOCUMENTS

DE 44 35 471 A1 4/1996

(Continued)

OTHER PUBLICATIONS

Synthophone: Spec page, The Synthophone: Techincal Specs, Softwind Instruments: "The Synthophone Zone", Internet Citation XP002393502, Retrieved from the Internet: URL:http://web.archive.org/web/20010404034714/home.att.net/{synthophone/> [retrieved Aug. 4, 2006], pp. 1,6,12.

*Primary Examiner*—Marlon T Fletcher
(74) *Attorney, Agent, or Firm*—Dickstein Shapiro LLP

(57) ABSTRACT

A hybrid wind musical instrument is a combination of an alto saxophone and an electronic system, and a player has an option between acoustic tones and electronic tones to be produced during performance; the electronic system includes sensors monitoring selected component parts of the key mechanism so as to determine the electronic tones intended to be produced by the player, and plural combinations of pieces of magnet and Hall-effect elements serve as the sensors: However, the component parts of key mechanism are arranged in a narrow space over the surface of tubular instrument body; driven parts are attached to the selected component parts so as to bridge gap between the selected component parts and the Hall-effect elements remote from the selected component parts.

20 Claims, 12 Drawing Sheets

U.S. PATENT DOCUMENTS

| | | | | |
|---|---|---|---|---|
| 5,736,662 | A | 4/1998 | Spector | |
| 6,002,080 | A * | 12/1999 | Tanaka | 84/615 |
| 6,329,582 | B1 | 12/2001 | Catalano, Jr. | |
| 6,525,252 | B1 | 2/2003 | Klausen et al. | |
| 6,538,189 | B1 | 3/2003 | Ethington | |
| 6,881,890 | B2 | 4/2005 | Sakurada | |
| 7,049,503 | B2 | 5/2006 | Onozawa et al. | |
| 7,390,959 | B2 | 6/2008 | Masuda | |
| 7,470,852 | B2 * | 12/2008 | Masuda | 84/615 |
| 2005/0217464 | A1 | 10/2005 | Onozawa et al. | |
| 2006/0283312 | A1 | 12/2006 | Shibata | |
| 2007/0017346 | A1 * | 1/2007 | Masuda | 84/600 |
| 2008/0087157 | A1 * | 4/2008 | Suzuki et al. | 84/385 A |
| 2008/0314226 | A1 * | 12/2008 | Shibata | 84/384 |
| 2009/0019999 | A1 * | 1/2009 | Onozawa | 84/658 |
| 2009/0020000 | A1 * | 1/2009 | Onozawa | 84/723 |

FOREIGN PATENT DOCUMENTS

| | | | |
|---|---|---|---|
| EP | 1 585 107 | A2 | 10/2005 |
| EP | 1 585 107 | A3 | 10/2005 |
| GB | 1393542 | A | 2/1972 |
| JP | 63-47397 | | 3/1988 |
| JP | 6-33-514 | | 8/1994 |
| JP | 2005-5316417 | | 11/2005 |

* cited by examiner

HYBRID WIND MUSICAL INSTRUMENT AND ELECTRIC SYSTEM FOR THE SAME

FIELD OF THE INVENTION

This invention relates to a hybrid musical instrument and, more particularly, to a hybrid musical instrument capable of producing acoustic tones and electronic tones and an electric system used for producing electric tones.

DESCRIPTION OF THE RELATED ART

There is disclosed an acoustic saxophone equipped with finger sensors in Japan Utility Model Application laid-open No. Sho 63-47397, and the finger sensors are connected to a music keyboard synthesizer. The prior art hybrid music system, i.e., the combination of the saxophone, finger sensors and music keyboard synthesizer makes it possible to perform a music tune through the electronic tones by selectively depressing and releasing the touch-pieces and levers of acoustic saxophone.

A hybrid saxophone is disclosed in Japan Patent Application laid-open No. 2005-316417. The prior art hybrid saxophone has an external appearance like an acoustic saxophone, and includes the tubular body, key mechanism, key sensor system, acoustic mouthpiece, electronic mouthpiece, controller and a sound system. The lip sensor, wind sensor and tonguing sensor are provided inside the electronic mouthpiece.

When a user wishes to perform a music tune through the acoustic tones, the acoustic mouthpiece is fitted to the tubular body. While the user is blowing into the acoustic mouthpiece, the column of air vibrates for producing the acoustic tones, and the user fingers on the key mechanism for changing the pitch of acoustic tones.

On the other hand, the electronic mouthpiece, key sensor system, controller and sound system are prepared for performance through electronic tones. When a user wishes to perform a music tune through the electronic tones, the acoustic mouthpiece is replaced with the electronic mouthpiece. While the user is blowing into the electronic mouthpiece, the sensors produce the electric signal representative of how the player varies the breath, lips and tongue, and key sensor system produces the electric signals representative of current key position. The electric signals are supplied to the tone generating system, and the tone generating system and sound system produce the electronic tones on the basis of the pieces of performance data carried on the electric signals.

In the hybrid music system disclosed in the Japan Utility Model Application laid-open, the finger sensors are implemented by switches, and the switches are provided on the outer surface of the tubular saxophone body. Arms are fitted to the levers of key mechanism, and the switches are changed between on-state and off-state by means of the arms. If the key, shaft, arm, tone hole and switch are appropriately arranged on the tubular saxophone body, the switch is changed between the on-state and the off-state at the timing at which the tone hole is just closed with the key and at the timing at which the key is just spaced from the tone hole. However, there is a possibility that the relative position among the key, shaft, arm, switch and tone hole is unintentionally varied. When the relative position is varied, the switch may be changed before the tone hole is imperfectly closed with the key, or the switch may not be changed under the condition that the tone hole is closed with the key. Thus, the switches are not reliable.

Pieces of magnet and Hall-effect elements form the key sensors in the Japan Patent Application laid-open, and the distance between the pieces of magnet and Hall-effect elements is continuously converted to the electric signals. Therefore, it is easily automatically to calibrate the key sensors, and the relative position between the tone holes and the keys are precisely determinable on the basis of the basis of the calibrated relation between the potential level of the detecting signals. However, a problem is encountered in the prior art saxophone in the location of key sensors on the tubular body of hybrid saxophone. In the Japan Patent Application laid-open, the pieces of magnet are directly secured to the component parts of key mechanism such as levers, and the Hall-effect elements are opposed to the pieces of magnet on the surface of the tubular body. In this arrangement, the manufacturer can not always make the key sensors monitor the most appropriate component parts of the key mechanism, because the component parts of key mechanism are arranged on and over the surface of tubular body at high density. When any space is not found in the vicinity of the most appropriate component part, the manufacturer must abandon the monitoring on the most appropriate component part, and look for the second best component part. Thus, the fingering on the key mechanism is not monitored through the most appropriate component parts in the prior art hybrid saxophone, and the pieces of performance data expressing the fingering are less reliable. For this reason, there is a possibility to produce the electronic tones at the pitch different from that intended by the player.

SUMMARY OF THE INVENTION

It is therefore an important object of the present invention to provide a hybrid wind musical instrument, which makes it possible to produces electronic tones at the pitch intended by a player.

It is also an important object of the present invention to provide an electric system, which is incorporated in the hybrid wind musical instrument.

To accomplish the object, the present invention proposes to transmit the movements of component parts of a key mechanism to movable parts of sensors through driven parts.

In accordance with one aspect of the present invention, there is provided a hybrid wind musical instrument for selectively producing acoustic tones and electric tones comprising a tubular instrument body defining a vibratory column of air therein, a wind inlet piece connected to the tubular instrument body and blown by the player for vibrations of the vibratory column of air, a key mechanism provided on a surface of the tubular instrument body and including plural component parts selectively driven by a player for specifying a pitch of the acoustic tones and a pitch of the electric tones, and an electric system including first sensors monitoring movements of selected ones of the plural component parts and having respective movable parts and respective stationary parts so as to produce first detecting signals representative of pieces of performance data through relative motion between the movable parts and the stationary parts, second sensors monitoring the blow into the wind inlet piece for producing second detecting signals representative of other pieces of performance data, driven parts connected to the selected ones of the component parts and retaining the movable parts so that the movable parts are moved in the vicinity of the stationary parts and a control unit connected to the first sensors and the second sensors for producing an electric signal representative of the electric tones to be produced on the basis of the pieces of performance data and the other pieces of performance data.

In accordance with another aspect of the present invention, there is provided an electric system for a hybrid wind musical instrument including a tubular instrument body, a wind inlet piece and a key mechanism, and the electric system comprises first sensors monitoring movements of selected ones of component parts of the key mechanism and having respective movable parts and respective stationary parts so as to produce first detecting signals representative of pieces of performance data through relative motion between the movable parts and the stationary parts, second sensors monitoring blow into the wind inlet piece for producing second detecting signals representative of other pieces of performance data, driven parts connected to the selected ones of the component parts and retaining the movable parts so that the movable parts are moved in the vicinity of the stationary parts and a control unit connected to the first sensors and the second sensors for producing an electric signal representative of the electric tones to be produced on the basis of the pieces of performance data and the other pieces of performance data.

BRIEF DESCRIPTION OF THE DRAWINGS

The features and advantages of the hybrid wind musical instrument and electric system will be more clearly understood from the following description taken in conjunction with the accompanying drawings, in which.

DESCRIPTION OF THE PREFERRED EMBODIMENTS

Figure 1:
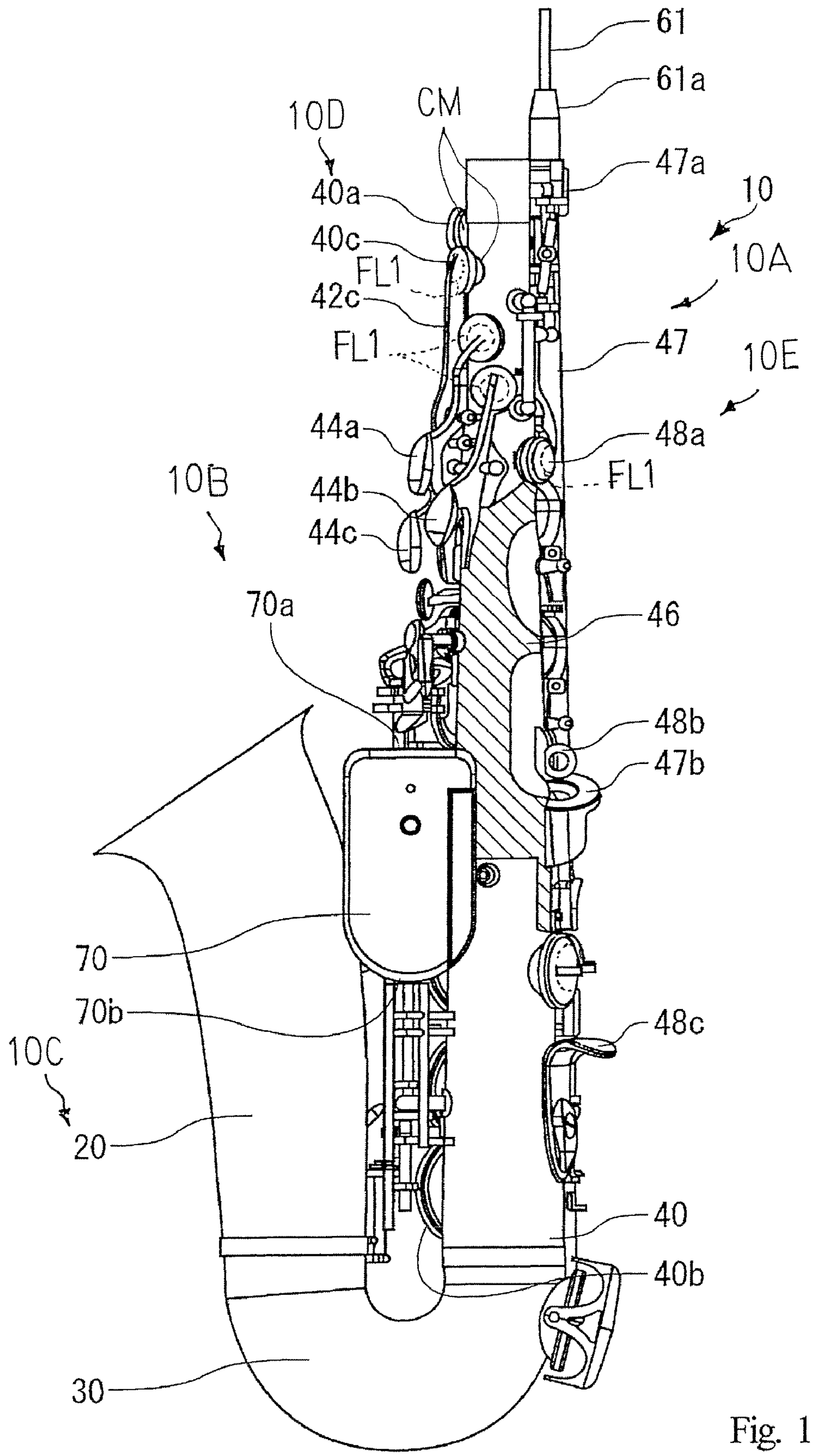
FIG. 1 is a left side view showing the structure of an alto saxophone forming a part of a hybrid wind musical instrument of the present invention.

A hybrid wind musical instrument embodying the present invention largely comprises a tubular instrument body, a wind inlet piece, a key mechanism and an electric system. While the electric system is standing idle, a player produces acoustic tones through vibrations of column of air along a music tune by blowing into the wind inlet piece. On the other hand, when the electric system is energized, the hybrid wind musical instrument gets ready to produce electric tones. While a player is blowing into the wind inlet pieces, the electric system produces an electric signal representative of the electric tones to be produced, and the electric signal is converted to electric tones through a suitable sound system.

A vibratory column of air is defined in the tubular instrument body, and the wind inlet piece is connected to the tubular instrument body. The player gives the blows into the wind inlet piece. The key mechanism is provided on a surface of the tubular instrument body, and includes plural component parts. The plural component parts are selectively driven by the player for specifying a pitch of the acoustic tones and a pitch of the electric tones.

The electric system includes first sensors, second sensors, driven parts and a control unit. The first sensors and second sensors are electrically connected to the control unit, and the driven parts are connected to selected ones of the component parts of key mechanism.

In detail, the first sensors have respective movable parts and respective stationary parts, and the movable parts are connected to the selected ones of component parts by means of the driven parts. On the other hand, the stationary parts are supported by the tubular instrument body in the vicinity of spaces where the movable parts are moved. Thus, the first sensors monitors movements of selected ones of the plural component parts, and produces first detecting signals representative of pieces of performance data through relative motion between the movable parts and the stationary parts.

The second sensors monitor the blow into the wind inlet piece, and produce second detecting signals representative of other pieces of performance data. The first detecting signals and second detecting signals are supplied to the control unit. The control unit analyzes the pieces of performance data and other pieces of performance data, and determines the electric tones to be produced. The control unit produces an electric signal representative of the electric tones, and the electric signal is supplied to a suitable electric device so that the electric tones are produced.

As will be understood from the foregoing description, the movements are transmitted from the selected ones of the component parts through the driven parts to the movable parts. Even if it is impossible to assign areas in the vicinity of the selected ones of component parts to the stationary parts, the driven parts bridge the gap between the selected one of component parts and the stationary parts so that the movable parts are moved in the vicinity of the stationary parts. For this reason, the movements of selected ones of component parts are accurately converted to the pieces of performance data, and the electric signal exactly represents the electric tones to be produced.

In the following description, terms “upside”, “downside”, “right” and “left” are determined by a player who is blowing the hybrid musical instrument. While the player is playing a music tune on the hybrid musical instrument, a “rear” portion of hybrid musical instrument is closer to the player than a “front” portion of the hybrid musical instrument. When the player gets ready to perform a music tune on the hybrid musical instrument, the longitudinal direction of hybrid musical instrument extends between the upside and the downside.

Structure of Alto Saxophone

Referring to FIGS. 1 to 4 of the drawings, a hybrid wind musical instrument 10 embodying the present invention largely comprises an acoustic wind instrument 10A and an electronic system 10B. A player blows the acoustic wind instrument 10A, and produces acoustic tones through vibrations of air column defined in the acoustic wind instrument 10A. The electronic system 10B is combined with the acoustic wind instrument 10A. While a player is playing a music tune on the acoustic wind instrument 10A combined with the electronic system 10B, electronic tones are produced through the electronic system 10B without any acoustic tones. Thus, the player can play music tunes on the hybrid wind musical instrument 10 selectively through the acoustic tones and electronic tones. In this instance, an alto saxophone is used as the acoustic wind instrument 10A.

While a player is performing a music tune on the hybrid musical instrument, he or she holds the hybrid wind musical instrument in his or her hands, and fingers on the acoustic wind instrument 10A. Essential parts of the electronic system 10B are fitted to the acoustic wind instrument 10A so that the player can freely twist and incline his or her body during the performance. The electronic system monitors the fingering on the acoustic wind instrument 10A so as to determine attributes of the electronic tones to be produced. Driven parts are selectively fitted to the component parts of the acoustic wind instrument 10A, and the fingering are replayed to the electronic system 10B through the driven parts. For this reason, the manufacturer assigns vacant areas and spaces on and over the acoustic wind instrument 10A to the component parts of electronic system 10B.

Figure 5:
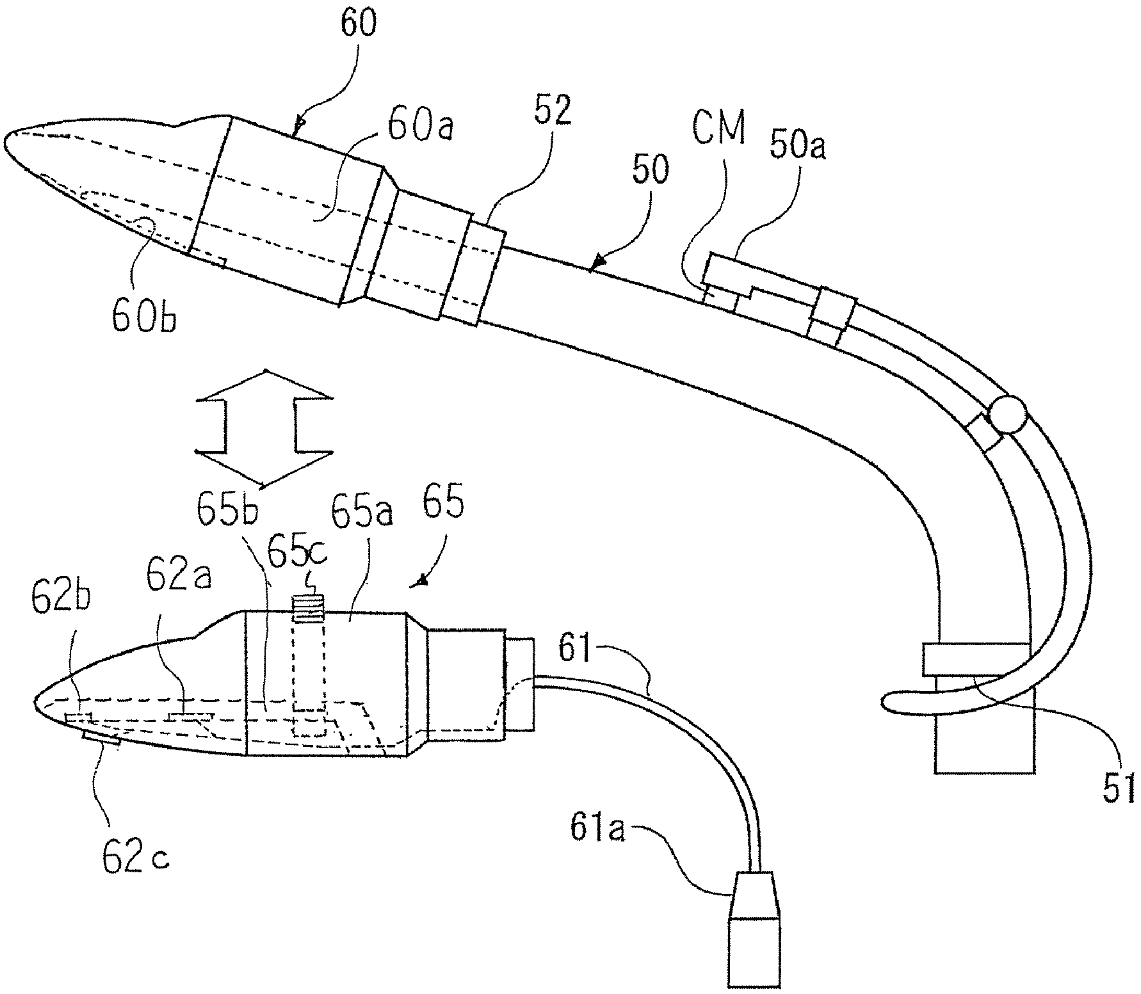
FIG. 5 is a right side view showing an acoustic mouthpiece and an electronic mouthpiece both forming parts of the hybrid musical instrument.

The acoustic wind instrument 10A includes a tubular instrument body 10C, a key mechanism 10D, accessory pats 10E and an acoustic mouthpiece 60, which is shown in FIG. 5. The acoustic mouthpiece 60 is fitted to one end of the tubular instrument body 10C, and is held in player's mouth for blowing. The key mechanism 10D is fitted onto the outer surface of the tubular instrument body 10C. The vibratory column of air is defined in the tubular instrument body 10C, and a player varies the length of vibratory column of air by means of the key mechanism 10D, thereby changing the pitch of acoustic tones.

The tubular instrument body 10C is broken down into a bell 20, a bow 30, a body 40 and a neck 50, and the bell 20, bow 30, body 40 and neck 50 are made of alloy. The body 40 is corresponding to the second tube of a standard alto saxophone. The bow 30 is curved so as to have a configuration like U-letter. The bell 20 is connected to one end of the bow 30, and is upwardly flared. The body 40 is connected at one end thereof to the other end of the bow 30 and at the other end thereof to a connecting portion 51 of the neck 50. Thus, the tubular instrument body 10C has a generally J-letter configuration. The acoustic mouthpiece 60 is fitted to the other end portion of the neck 50.

Plural tone holes are formed in the bell 20, bow 30, body 40 and neck 50, and tone hole chimneys project from the peripheries defining the tone holes. Broken lines FL1 are indicative of the locations of tone holes in FIG. 1, and several tone hole chimneys are labeled with reference "CM". The broken lines FL1 and reference sign CM are removed from the other figures so as to make the illustration less complicated. The tone holes are selectively opened and closed with the key mechanism 10D, and a player varies the length of vibratory column of air by means of the key mechanism 10D.

The key mechanism 10D is similar to the key mechanism of a standard alto saxophone so that a player fingers on the key mechanism 10D in similar fingering rules to those for the alto saxophone. The key mechanism 10D includes keys for the left hand such as, for example, a high F key 40*c*, keys for the right hand keys such as, for example, a D key 40*b*, touch-pieces 43*a* to 43*e* for the left hand keys, levers 44*a* to 44*e* for the left hand keys, touch-pieces 43*f* to 43*h* for the right hand keys and levers 44*f* to 44*l* for the right hand keys. The touch-pieces 43*a* to 43*h* and levers 44*a* to 44*l* are assigned to the thumbs and fingers in the standard fingering rules of alto saxophone. The high F# key 40*a* to D key 40*b* are provided on the body 40, and the low C key 30*a* and low C# key 30*b* are provided on the bow 30. The low B key 20*a* and low Bb key 20*b* are provided on the bell 20.

A player selectively opens and closes the keys for the heft hand by means of the touch-pieces 43*a* to 43*e* and levers 44*a* to 44*e*, and selectively opens and closes the keys for the right hand by means of the touch-pieces 43*f* to 43*h* and levers 44*f* to 44*l*. For example, the lever 44*i* is depressed and released for the high F# key 40*a*, and the high F key 40*c* is driven to open and close the tone hole by means of the lever 44*c*. Similarly, the touch-piece 43*h* is directly connected to the D key 40*b* so that a player depresses and releases the touch-piece 43*h* so as to open and close the tone hole with the D key 40*b*.

The key mechanism 10D further includes arms such as, for example, 22*b*, 32*a*, 42*a*, 42*c*, 45*c* and 45*d* and key rods such as, for example, 21*b*, 31*a*, 41*c* and 41*a*. The arms and rods are provided between the levers 44*a* to 44*l* and the keys, and torque, which are exerted on the levers 44*a* to 44*l*, are transmitted through the arms and rods to the associated keys.

Thus, even though the keys are remote from the levers 44*a* to 44*l*, a player can open and close the tone holes with the keys by virtue of the arms and key rods. For example, the arm 42*a* is connected to the high F# key 40*a*, and the key rod 41*a* is connected between the arm 42*a* and the lever 44*i*. When a player exerts torque on the lever 44*i*, the torque is transmitted through the key rod 41*a* and arm 42*a* to the high F# key 40*a*, and the high F# is driven for rotation. Thus, the tone hole is opened and closed with the high F# key 40*a* by mean of the lever 44*i*. Similarly, the arm 42*c* is connected to the high F key 40, and the key rod 41*c* is connected between the arm 42*c* and the lever 44*c*. When a player depresses the lever 44*c*, the torque is transmitted from the lever 44*c* through the key rod 41*c* and arm 42*c* to the high F key 40*a*, and the high F key 40*a* is driven for rotation. Thus, the tone hole is opened and closed with the high F key 40*a* by means of the lever 44*c*.

The low C key 30*a* is connected to the arm 32*a*, which in turn is connected to the key rod 31*a*. The low Bb key 20*b* is connected to the arm 22*b*, which in turn is connected to the key rod 21*b*. Torque is transmitted from the other levers to the associated keys through the arms and key rods. However, the arrangement of key mechanism 10D is similar to that of a standard alto saxophone. For this reason, no further description is hereinafter for the sake of simplicity.

As shown in FIG. 5, the acoustic mouthpiece 60 is formed with an air passage 60*a*, and is fitted to the neck 50 in such a manner that the air passage 60*a* is connected to the air passage in the tubular instrument body 10C. The acoustic mouthpiece 60 includes a reed 60*b*, and the reed 60*b* is exposed to the air passage 60*a*. While a player is performing a music tune on the hybrid wind instrument 10 through the acoustic tones, he or she puts the acoustic mouthpiece 60 in his or her mouth, and blows into the air passage 60*a*. Then, the reed 60*b* vibrates, and the vibrations of reed 60*b* are propagated to the column of air. Thus, the player gives rise to the vibrations of air column with the reed 60*b* attached to the acoustic mouthpiece 60.

A thumb rest 48*a*, a strap hook 48*b*, a finger hook 48*c*, a mouthpiece cork 52, a bell brace 80, a ligature (not shown), key guards 23 and 33*a* (see FIGS. 2, 3 and 4) and a cable guard 47 are categorized in the accessory parts 10E. As described hereinbefore, the player depresses and releases the touch-pieces 43*a* to 43*h* and levers 44*a* to 44*l* with his or her thumbs and fingers in performance. However, the player does not always exert force on the touch-pieces and levers with all of the thumbs and fingers. In order to make the idling thumbs take a rest, the thumb rest 48*a* is provided at the back of the levers 44*a* to 44*c* for the thumb of left hand. On the other hand, the finger hook 48*c* is prepared for the thumb of right hand at the back of the touch-pieces 43*f* and 43*g*.

The strap hook 48*b* is formed in the rear portion of the body 40. While a player is playing a music tune on the hybrid wind musical instrument 10, the player puts on a strap (not shown), and hooks up the strap hook 48*b* on the strap. Thus, the hybrid wind musical instrument 10 is hung from player's neck through the strap.

The mouthpiece cork 52 makes the acoustic mouthpiece 60 hermetically connected to the neck 50. The reed 60*b* is fitted to the acoustic mouthpiece 60 by means of the ligature (not shown).

The bell brace 80 is a rigid component part, and is capable of sustaining surely heavy parts without breakage thereof. In fact, the bell brace 80 is less liable to be damaged rather than surface portions of tubular instrument body 10C. Although the tubular instrument body 10C is curved from the body 40 to the bell 20, the body 40 has a certain portion, the center axis of which is roughly in parallel to a corresponding portion of the bell 20. The bell brace 80 is connected at one end thereof to the certain portion of body 40 and at the other end thereof to the corresponding portion of bell 20, and reinforces the tubular instrument body 10C. Moreover, the bell brace 80 is adapted to regulate acoustic characteristics of tubular instrument body 10C such as reverberation and long sound range. Since the bell brace 80 extends in the space between the body 40 and the bell 20, the thumbs and fingers of player do not invade the space around the bell brace 80.

Since the key mechanism 10D are exposed to the environment, players feel the key mechanism 10D to be liable to be unintentionally damaged. Moreover, when the players put their hybrid wind instruments 10 on tables, the keys, touch-pieces and levers make the hybrid wind instruments unstable on the tables. In order to sustain the hybrid wind instrument 10 on the table in stable, the key guard 23 and 33*a* are provided as the accessory parts 10E. The key guards 23 and 33*a* are attached to the bell 20. The key guard 23 is provided in association with the low Bb key 20*b* and low B key 20*a*, pre-vents these keys 20*a* and 20*b* from undesirable damage. The key guard 33*a* is provided in association with the low C key 30*a*, and prevents the key 30*a* from damage.

Figure 2:
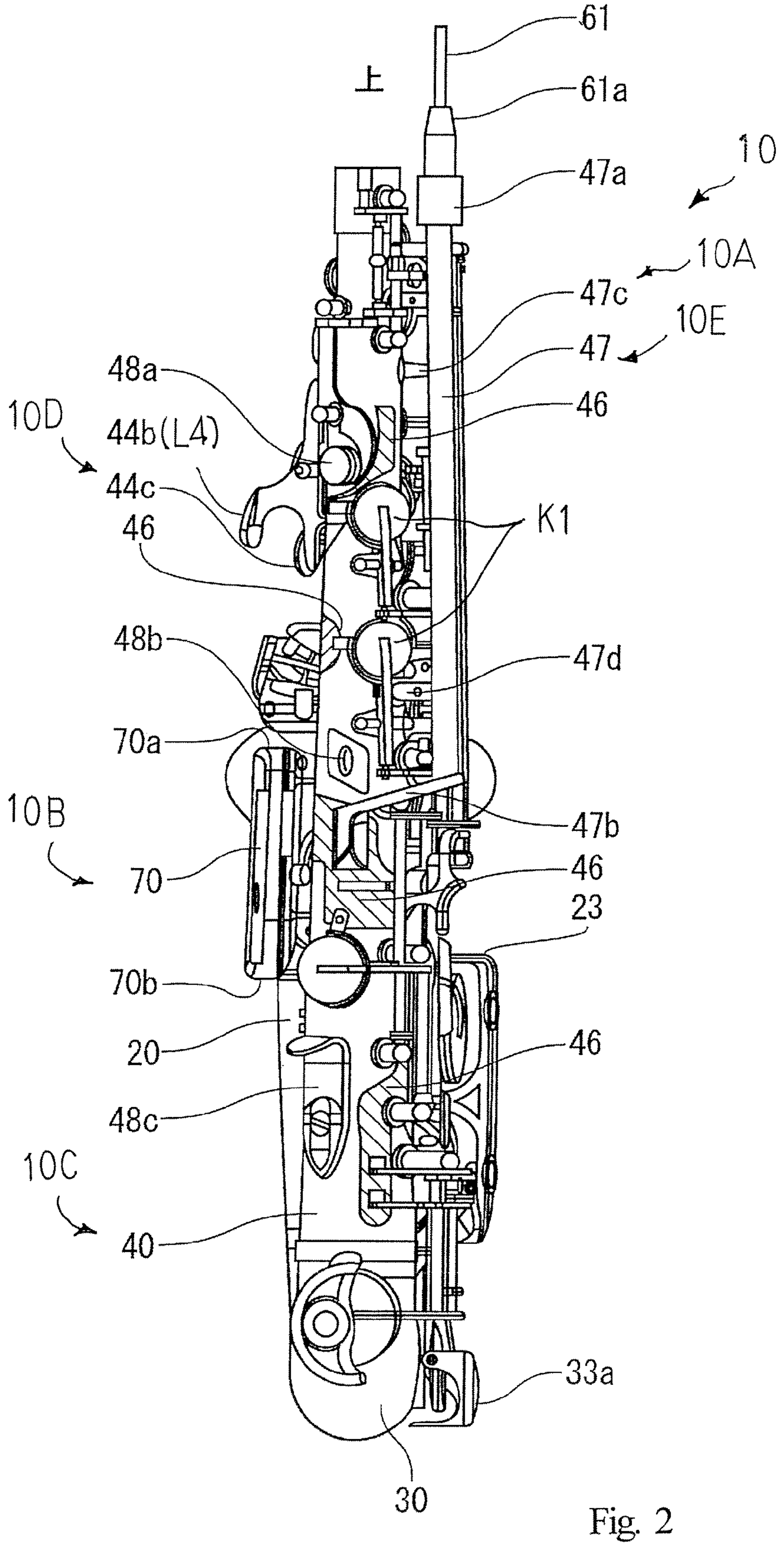
FIG. 2 is a back view showing the structure of the alto saxophone.
Figure 3:
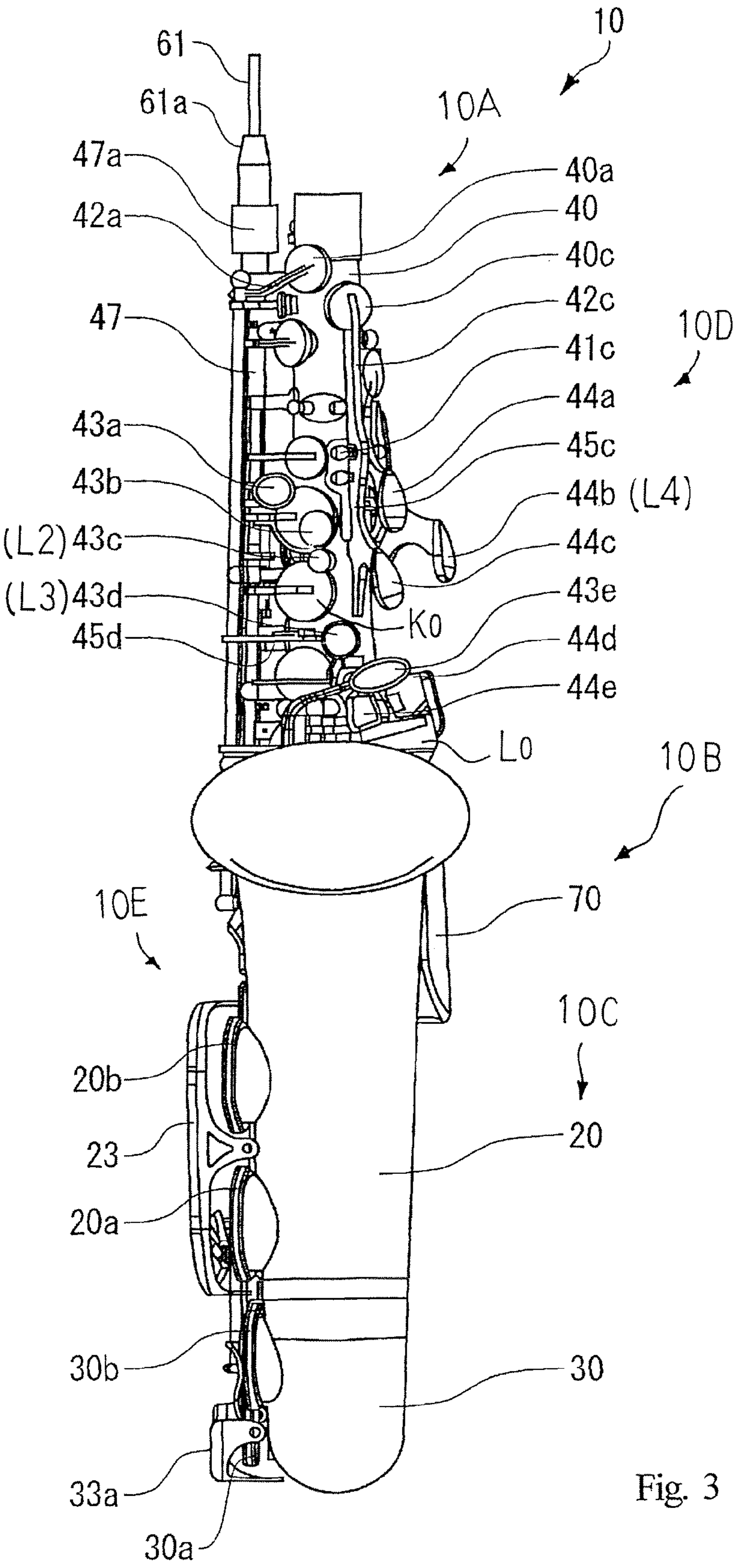
FIG. 3 is a front view showing the structure of the alto saxophone.
Figure 4:
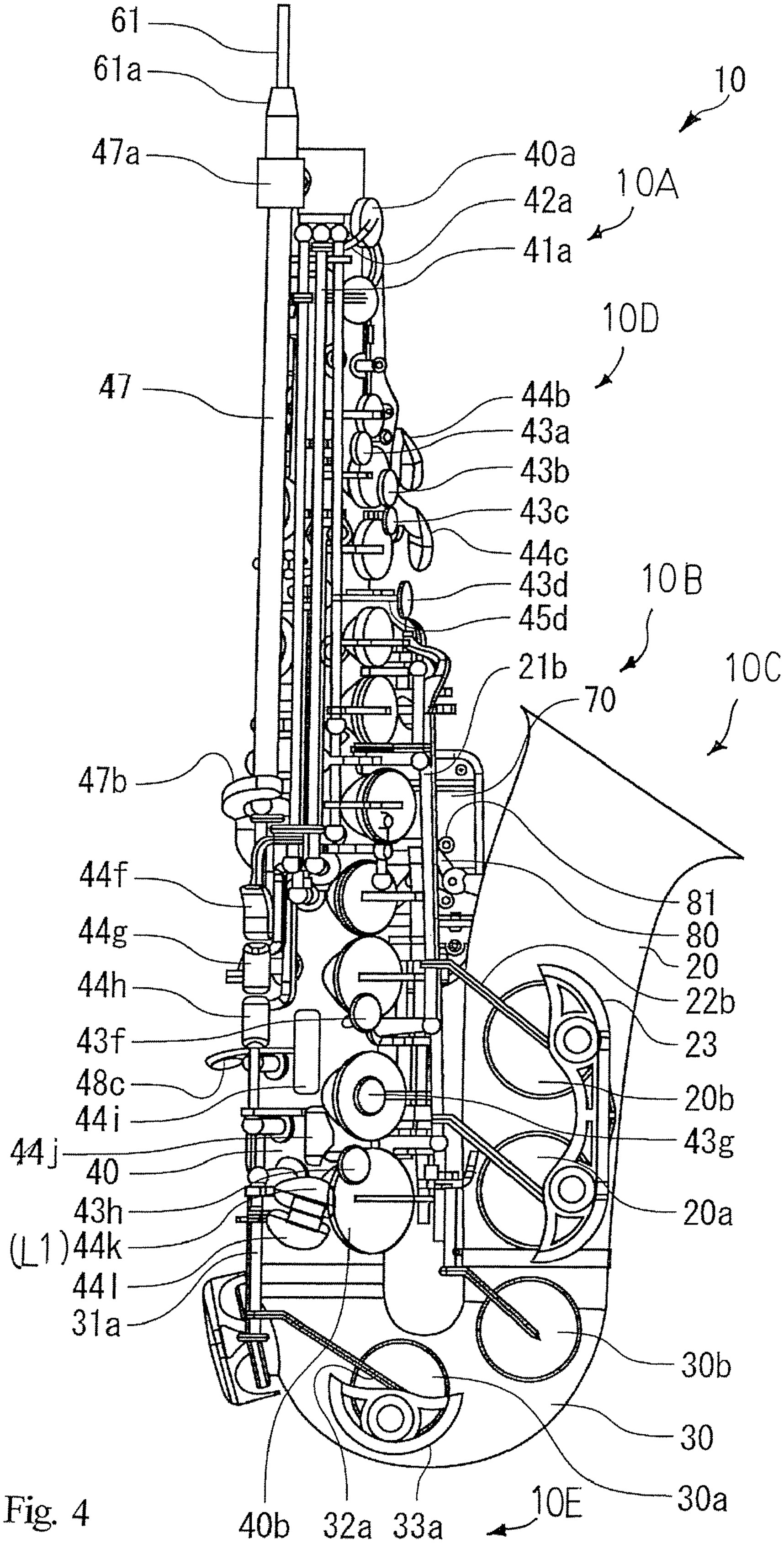
FIG. 4 is a right side view showing the structure of the alto saxophone.

The cable guard 47 is tubular, and is made of light metal such as, for example, aluminum or aluminum alloy. The cable guard 47 extends from the boundary between the neck 50 and the body 40 to a vicinity of the control unit 70, and is fitted to the tubular instrument body 10C by means of couplings 47*c* and 47*d* as shown in FIG. 2. In this instance, one-touch joints are used as the couplings 47*c* and 47*d* so that users easily remove the cable guard 47 from the tubular instrument body 10C. Although the component parts of key mechanism 10C are arranged at high density in the space around the upper portion of the body 40, a narrow space is found between the thumb rest 48*a* for the left hand and the key rod 41*a* and adjacent key rods, the narrow space is assigned to the cable guard 47.

The downstream cable (not shown) is housed in the cable guard 47 so that player's fingers do not get caught in the downstream cable in performance. In other words, the player does not unintentionally disconnect the downstream cable from the upstream cable 61.

The cable guard 47 has a connector 47*a* at the upper end thereof and another connector 47*b* at the lower end thereof. The connector 47*a* is connected to a downstream cable (not show), and the downstream cable passes from the connector 47*a* through an inner space of the cable guard 47 to the connector 47*b*.

System Configuration of Electronic System 10B

The control unit 70, cables 61 connectors 61*a*, 47*a* and 47*b* form parts of the electronic system 10B. The electronic system 10B further includes an electronic mouthpiece 65, a flexible circuit board 46, sensors 62*a*, 62*b*, 62*c*, 46*a*, 46*b*, 46*c*, 46*d*, . . . and 46*n* and driven parts 80, 800, 801, 802, 803 and 804. The electronic mouthpiece 65 is illustrated in FIG. 5, and sensors 62*a* to 62*c* and 46*a* to 46*n* and driven parts 80, 800, 801, 802, 803 and 804 are shown in FIGS. 6 to 12.

The sensors 62*a* to 62*c* report pieces of performance data expressing how a player blows to the control unit 70, and the sensors 46*a* to 46*n* report pieces of performance data expressing how the player fingers on the key mechanism 10D to the control unit 70. The control unit 70 processes the pieces of performance data, and produces music data codes expressing the electronic tones to be produced. Since the component parts of key mechanism 10D are arranged on the surface of tubular instrument body 10C at high density, it is difficult to assign optimum positions to the sensors 46*a* to 46*n*. The driven parts 80 and 800 to 804 are connected to certain component parts of the key mechanism 10D. When the certain component parts are moved, the driven parts 80 and 800 to 804 are moved together with the certain component parts. Even if the optimum positions on the tubular instrument body 10C are not assigned to several sensors 46*a* to 46*n*, the movements of certain component parts are transmitted to any positions on the tubular instrument body 10C by virtue of the driven parts 80 and 800 to 804. Thus, the driven parts 80 and 800 to 804 make it possible to install the several sensors 46*a* to 46*n* at convenient positions spaced from the optimum positions.

The electronic mouthpiece 65 is replaceable with the acoustic mouthpiece 60. When a player wishes to perform a music tune through the electronic tones, he or she separates the acoustic mouthpiece 60 from the mouthpiece cork 52, and connects the electronic mouthpiece 65 to the neck 50 through the mouthpiece cork 52.

The electronic mouthpiece 65 has a mouthpiece body 65*a*, which has a configuration like the acoustic mouthpiece 60. The mouthpiece body 65*a* is formed with an air passage 65*b*, and the air passage 65*b* is open to the lower surface of the mouthpiece body 65*a*. In other words, the air passage 65*b* is not connectable to the vibratory column of air in the tubular instrument body 10C. An orifice plate 65*c* is rotatably supported by the mouthpiece body 65*a*, and crosses the air passage 65*b*. The orifice plate 65*c* is formed with a variable orifice, and the variable orifice stops down the air passage 65*b*. The area of variable orifice in the air passage 65*b* is dependent on the angular position of the orifice plate 65*c* so that a player adjusts the backpressure to a value optimum to him or her by rotating the orifice plate 65*c*.

The sensors 62*a*, 62*b* and 62*c* are called as "wind sensor", "tonguing sensor" and "lip sensor", respectively. The wind sensor 62*a* is provided in the air passage 65*b*, and converts the pressure of breath to a detecting signal S1.

The tonguing sensor 62*b* is implemented by a photo-coupler, and is provided in the vicinity of the inlet opening of air passage 65*b* so as to radiate a light beam toward the inlet opening. When the player projects his or her tongue during the performance, the tip of tongue is brought into contact with the end surface of mouthpiece body 65*a*, and makes the amount of reflection varied. Thus, the tonguing sensor 62*b* converts the projection of tongue to a detecting signal S2.

The lip sensor 62*c* is provided on the lower surface of the mouthpiece body 65*a* in the vicinity of the inlet opening of air passage 65*b*. When the player blows, he or she puts the electronic mouthpiece 65 into the mouth, and presses the electronic mouthpiece 65 with lips. The lip sensor 62*c* converts the pressure exerted by the lips to a detecting signal S3. Thus, the detecting signals S1 to S3 are representative of pieces of performance data expressing the breath pressure, position of tongue and state of lips.

The detecting signals S1, S2, S3 are propagated from the wind sensor 62*a*, tonguing sensor 62*b* and lip sensor 62*c* through an upstream cable 61. The upstream cable 61 is terminated at a connector 61*a*, and the connector 61*a* is engaged with and disengaged from the connector 47*a*. When a player engages the connector 61*a* with the connector 47*a*, the wind sensor 62*a*, tonguing sensor 62*b* and lip sensor 62*c* are electrically connected through the upstream cable 61, connectors 61*a* and 47*a* and downstream cable (not shown) to the connector 47*b*. When the player separates the electronic mouthpiece 65 from the tubular instrument body 10C, he or she disconnects the upstream cable 61 from the downstream cable by disengaging the connector 61*a* from the connector 47*a*. Thus, the player can easily replace the electronic mouthpiece 65 to the acoustic mouthpiece 60 and vice versa.

The flexible circuit board 46 is wound on the body 40 of tubular instrument body 10C, and is secured to the tubular instrument body 10C below the key mechanism 10D. Hatching lines indicates the flexible circuit board 46 in FIGS. 1, 2 and 6 to 11 so as to make it possible to discriminate the flexible circuit board 46 from the component parts of the acoustic wind instrument 10A. Although the flexible circuit board 46 includes an insulating flexible film, a protective film and conductive strips, these components parts of flexible circuit board 46 are not shown in the drawings. The conductive strips are printed on the insulating flexible, and are covered with the protective film. The conductive strips are assigned to the detecting signals S1 to S3 and other detecting signals S4 to Sn, and the detecting signals S1 to S3 and S4 to Sn are propagated from the sensors 62*a* to 62*c* and 46*a* to 46*n* through the conductive strips to the control unit 70.

The sensors 46*a* to 46*n* are called as "touch sensors", and the touch sensors 46*a* to 46*n* monitor suitable component parts of key mechanism 10D to see what tone the player intends to produce. In other words, the suitable component parts of key mechanism 10D are selected in such a manner that the control unit 70 can determine the pitch of tone to be produced on the basis of a combination of detecting signals S4 to Sn output from the touch sensors 46*a* to 46*n*.

Moreover, the suitable component parts are selected from the key mechanism 10D found over the outer surface of body 40 in this instance. In other words, the keys 20*a* and 20*b*, which are provided on the bell 20, keys 30*a* and 30*b*, which are provided on the bow 30, and key 50*a*, which is provided on the neck 50, are indirectly monitored with the touch sensors 46*a* to 46*n*. This feature is desirable, because the flexible circuit board 46 is wound on only the body 40.

Each of the touch sensors 46*a* to 46*n* is implemented by a piece of magnet 83*a*, 83*b*, 83*c*, 83*d*, 83*e* or 804*a* and a Hall-effect element 49. The Hall-effect elements 49 are provided on the conductive strips assigned to the touch sensors 46*a* to 46*n*. In case where space is found in the vicinity of the suitable component part, the piece of magnet is directly secured to the suitable component part, and is opposed to the Hall-effect element on the flexible circuit board 46. However, the appropriate space is not always found in the vicinity of all of the suitable component parts. In case where the space is not found, the driven parts 80 and 800 to 804 are fitted to the suitable component parts of key mechanism, and the pieces of magnet are secured to the driven parts 80 and 800 to 804. In this instance, the driven parts 80 and 800 to 804 are provided for six sorts of key sub-mechanisms respectively shown in FIGS. 6 to 11. Each of the six sorts of key sub-mechanisms is not always found a single part of the key mechanism 10D. For this reason, the component parts of key mechanism 10D are labeled with references different from those used in FIGS. 1 to 4. The references used in FIGS. 1 to 4 are corresponding to the references used in FIGS. 6 to 11 as follows.

A key K1 is corresponding to each of the two keys also labeled with "K1" in FIG. 2. A lever L4 is also corresponding to the lever 44*b* shown in FIGS. 2 and 3. A key K0 and a lever L0 are respectively corresponding to the key and lever also labeled with "K0" and "L0" in FIG. 3, and the touch-pieces 43*c* and 43*d* are corresponding to touch-pieces K2 and L3 in FIG. 3. A lever L1 is corresponding to the lever 44*k* shown in FIG. 4.

When a player depresses the touch-pieces 43*a* to 43*h* and levers 44*a* to 44*l*, the suitable component parts of key mechanism 10D and driven parts 80 and 800 to 804, if any, make the pieces of magnet such as those labeled with 83*a* to 83*e* and 804*a* selectively moved toward the Hall-effect elements 49. The Hall-effect elements 49 vary their resistance depending upon the distance from the associated pieces of magnet 83*a* to 83*e* and 804*a*. For this reason, when one of the pieces of magnet 83*a* to 83*e* and 804*a* is moved toward the associated Hall-effect element 49, the associated Hall-effect element 49 makes the potential level on the associated conductive line varied. The potential level is taken out from the conductive lines as the detecting signals S4 to Sn, and the detecting signals S4 to Sn are supplied to the control unit 70.

The potential level of detecting signals S4 to Sn forms various patterns of potential level depending upon the depressed touch-pieces 43*a* to 43*h* and depressed levers 44*a* to 44*l*. In other words, the patterns of potential level are respectively corresponding to the electronic tones to be produced. The controlling unit 70 determines the tone intended to produce on the basis of the pattern of the potential level of detecting signals S4 to Sn.

Description is hereinafter made on the six sorts of key sub-mechanisms with reference to FIGS. 6 to 11.

First Sort of Key Sub-Mechanism

Figure 6:
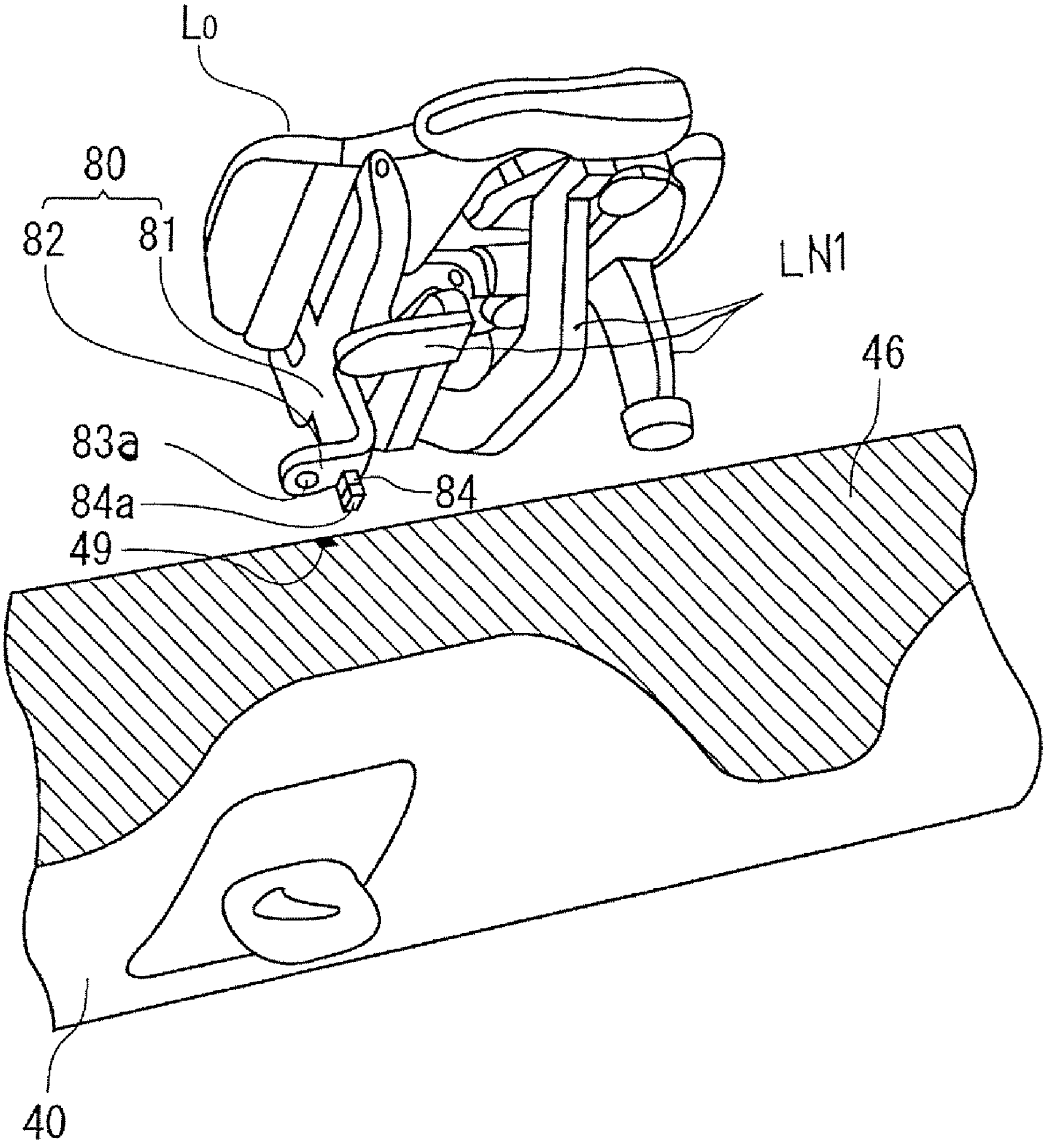
FIG. 6 is a perspective view showing the structure of first sort of key sub-mechanism forming a part of a key mechanism incorporated in the hybrid wind musical instrument.

FIG. 6 shows the first sort of key sub-mechanism. The first sort of key sub-mechanism includes the key (not shown) and lever L0, and the lever L0 is linked with the key (not shown) through other component parts of the first sort of key sub-mechanism. The player opens and closes the tone hole with the key (not shown) by depressing and releasing the lever L0. The lever L0 serves as one of the suitable component parts. However, the lever L0 is widely spaced from the flexible circuit board 46 due to the other links LN1. Thus, it is difficult directly to secure the piece of magnet 83*a* to the lever L0.

In this situation, the driven part 80 is fitted to the lever L0, and the driven part 80 projects from the lever L0 toward the flexible circuit board 46. When the player depresses the lever L0, the driven part 80 is moved toward the flexible circuit board 46 together with the lever L0. On other hand, when the player spaces the lever L0 from the flexible circuit board 46, the driven part 80 is spaced from the flexible circuit board 46 together with the lever L0.

The driven part 80 has a leg portion 81, a toe portion 82 and a small projection 84. The toe portion 82 is bent from the leg portion 81 at right angle, and the small projection 84 protrudes from the toe portion 82 toward the flexible circuit board 46. The leg portion 81 is fitted to the lever L0, and makes the toe portion 82 closer to the flexible circuit board 46 than the lever L0. For this reason, the space where the toe portion 82 is moved is closer to the flexible circuit board 46 than the space in which the lever L0 is moved.

The piece of magnet 83*a* is secured to the tow portion 82, and a piece of soft material 84*a* such as, for example, cork is adhered to the small projection 84. Although the piece of soft material 84*a* is designed not to be brought into collision with the flexible circuit board 46, the lever L0 may become close to the flexible circuit board 46. Even if the lever L0 becomes close to the flexible circuit board 46, the driven part 80 does not give any damage to the flexible circuit board 46 by virtue of the piece of soft material 84*a*.

The Hall-effect element 49 is provided on the conductive strip of the flexible circuit board 46, and is opposed to the piece of magnet 83*a*. If the piece of magnet 83*a* is directly secured to the lever L0, the Hall-effect element 49 can not widely swing the potential level of detecting signal due to the wide space between the piece of magnet 83*a* and the Hall-effect element 49. The driven part 80 makes the piece of magnet 83*a* close to the Hall-effect element 49. For this reason, the potential level of detecting signal is widely swung. As a result, the control unit 70 exactly determines whether or not the player depresses the lever L0.

Second Sort of Key Sub-Mechanism

Figure 7:
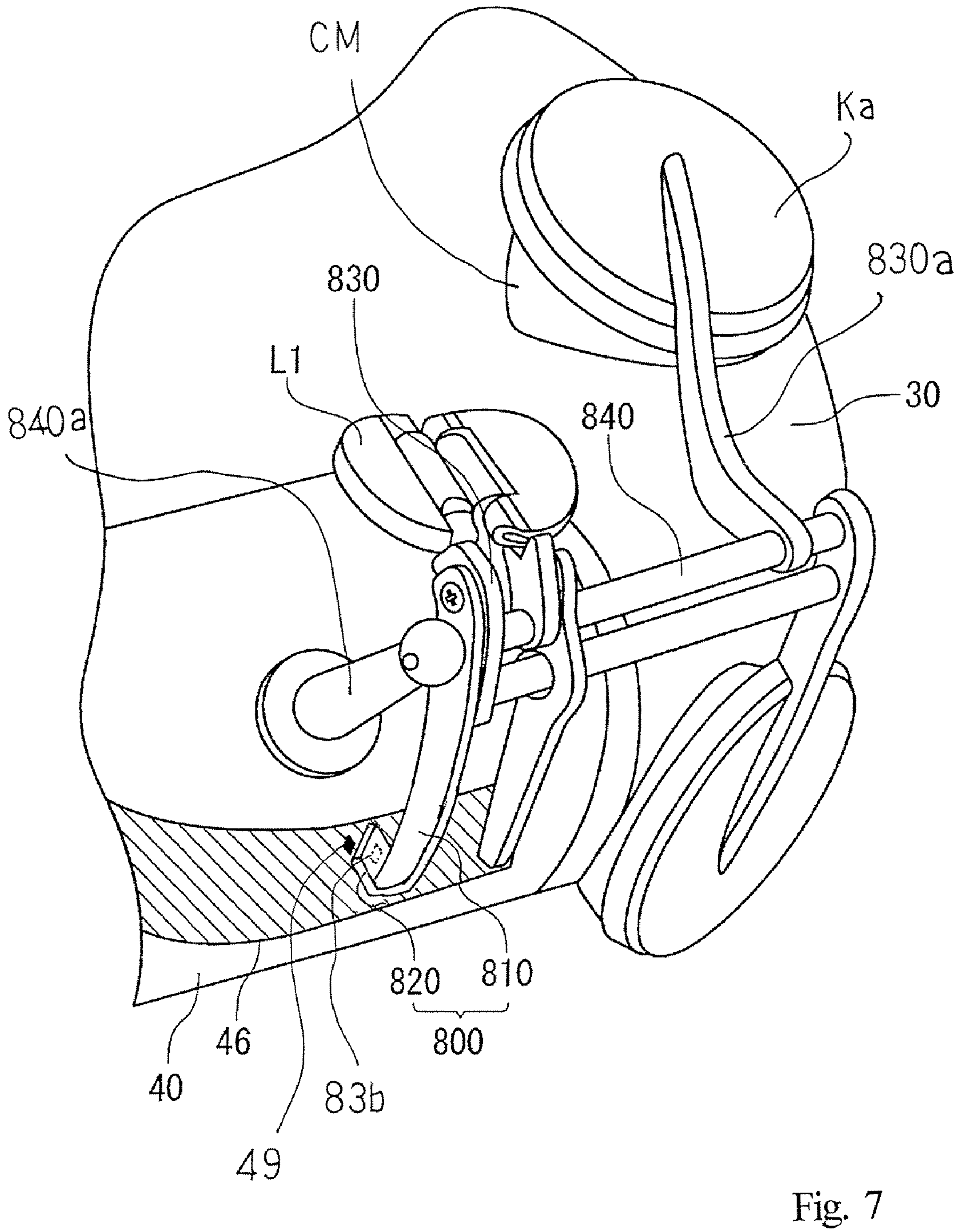
FIG. 7 is a perspective view showing the structure of second sort of key sub-mechanism forming another part of the key mechanism.

FIG. 7 shows the second sort of key sub-mechanism incorporated in the key mechanism 10D. The second sort of key sub-mechanism includes the lever L1, arm 830, key rod 840, posts 840*a*, arm 830*a* and key Ka, and the lever L1 is another of the suitable component parts. However, the flexible circuit board 46 does not extend to the area below the lever L1 due to one of the posts 840*a*. For this reason, the Hall-effect element 49 can not occupy the area under the lever L1.

The lever L1 is connected to one end of the arm 830, and the arm 830 is secured to the key rod 840. The key rod 840 is rotatably supported by the body 40 by means of the posts 840*a*, only one of which is illustrated in FIG. 7. As a result, the lever L1 is rotatable about the center axis of key rod 840 together with the arm 830. The arm 830*a* is further connected at one end thereof to the key rod 840 and at the other end thereof to the key Ka. Thus, the player opens and closes the tone hole, which is defined by the tone hole chimney CM, with the key Ka by depressing and releasing the lever L1.

In this situation, the driven part 800 is bolted to the arm 830. The driven part 800 has an arm portion 810, the curvature of which is approximately equal to that of the arm 830, and a hand portion 820. The arm portion 810 extends in a direction opposite to the direction toward the lever L1, and is curved toward the flexible circuit board 46. For this reason, the leading end portion of arm portion 810 reaches the space over the flexible circuit board 46, and is closer to the flexible circuit board 46 than the arm 830 is. The hand portion 820 projects from the side surface of arm portion 810 at right angle, and occupies a space over the flexible circuit board 46. The piece of magnet 83*b* is secured to the hand portion 820, and is opposed to the Hall-effect element 49.

When the player depresses and releases the lever L1, the lever L1 gives rise to rotation of arm 830 and driven part 800 about the center axis of the key rod 840, and the piece of magnet 83*b* gets close to and spaced from the associated Hall-effect element 49, and the Hall-effect element 49 makes the potential level on the associated conductive strip widely swung.

Thus, even if the suitable component part 830 is spaced from and offset from the area on the flexible circuit board 46 assigned to the Hall-effect element 49, the driven part 800 makes it possible to move the piece of magnet 83*b* in the appropriate space in the vicinity of the Hall-effect element 49.

Third Sort of Key Sub-Mechanism

Figure 8:
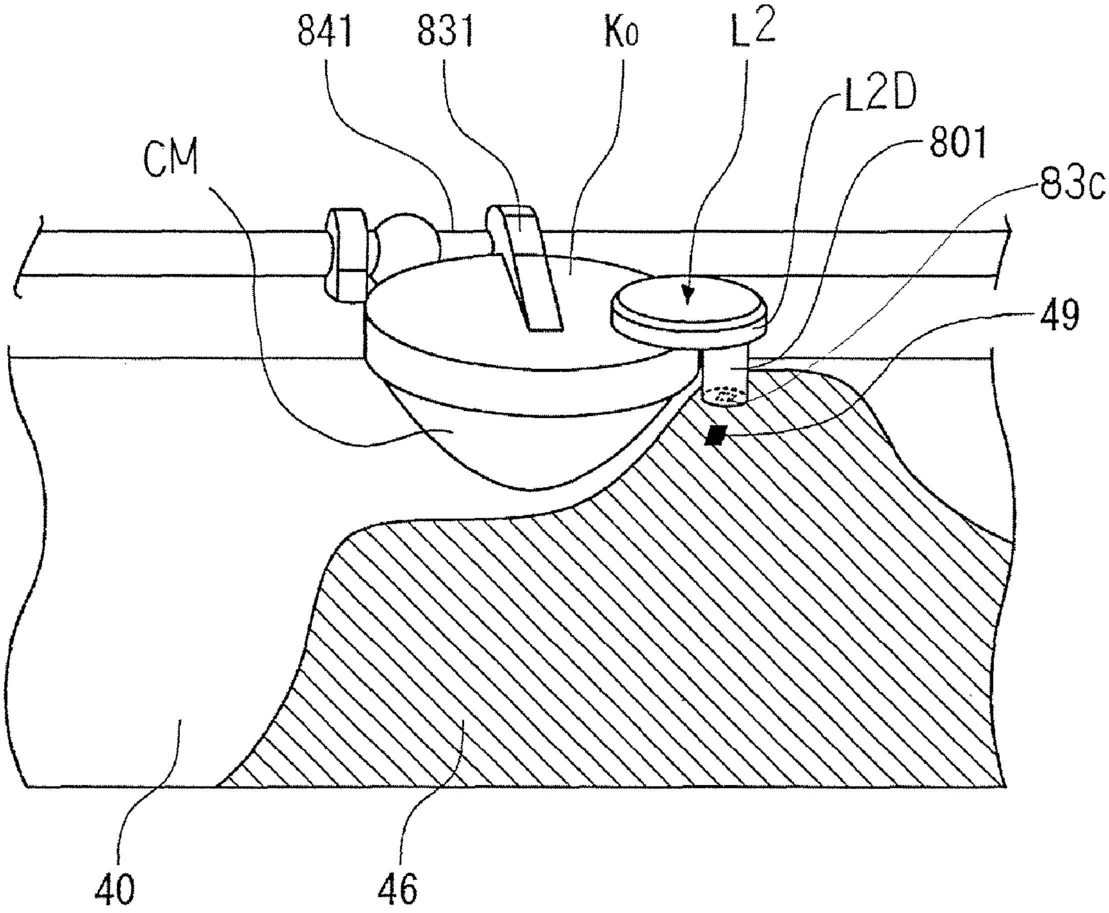
FIG. 8 is a perspective view showing the structure of third sort of key sub-mechanism forming yet another part of the key mechanism.

FIG. 8 shows the third sort of key sub-mechanism incorporated in the key mechanism 10D. The third sort of key sub-mechanism includes the key K0, touch-piece L2, arm 831 and key rod 841. The key rod 841 is rotatably supported by the body 40 by means of posts (not shown), and the arm 831 is connected at one end thereof to the key rod 841 and at the other end thereof to the key K0. Therefore, the arm 831 and key K0 are rotated about the center axis of key rod 841, and the tone hole, which is defined by the tone hole chimney CM, is opened and closed with the key K0.

The touch-piece L2 is directly secured to the key K0, and is partially overlapped with the key K0. The key K0 has a circular top surface, and the touch-piece L2 has a circular top surface. The center of circular top surface of touch-piece is on the periphery of circular top surface of key K0. For this reason, a part L2D of touch-piece L2 protrudes from the key K0. The player exerts force on and removes the force from the touch-piece L2 so as to change the pitch of tone. The touch-piece L2 is yet another of the suitable component parts. However, the tone hole chimney CM and key K0 make the touch-piece L2 spaced from the flexible circuit board 46. Moreover, the touch-piece L2 is too close to the adjacent component to directly fit the piece of magnet 83*c* thereto. In this situation, the driven part 801 is fitted to the touch-piece 801. The driven part 801 has a column shape, and projects from the part L2D of touch-piece L2 toward the flexible circuit board 46.

The piece of magnet 83*c* is secured to the lower surface of the driven part 801, and is opposed to the Hall-effect element 49 on the associated conductive strip of the flexible circuit board 46. When the player exerts force on and releases the force from the touch-piece L2, the driven part 801 is rotated about the center axis of key rod 841, and the piece of magnet 83*c* gets close to and spaced from the Hall-effect element 49. Thus, the driven part 801 makes the piece of magnet 83*c* moved in the space close to the Hall-effect element 49. As a result, the Hall-effect element 49 causes the potential level on the associated conductive strip widely to be swung.

Fourth Sort of Key Sub-Mechanism

Figure 9:
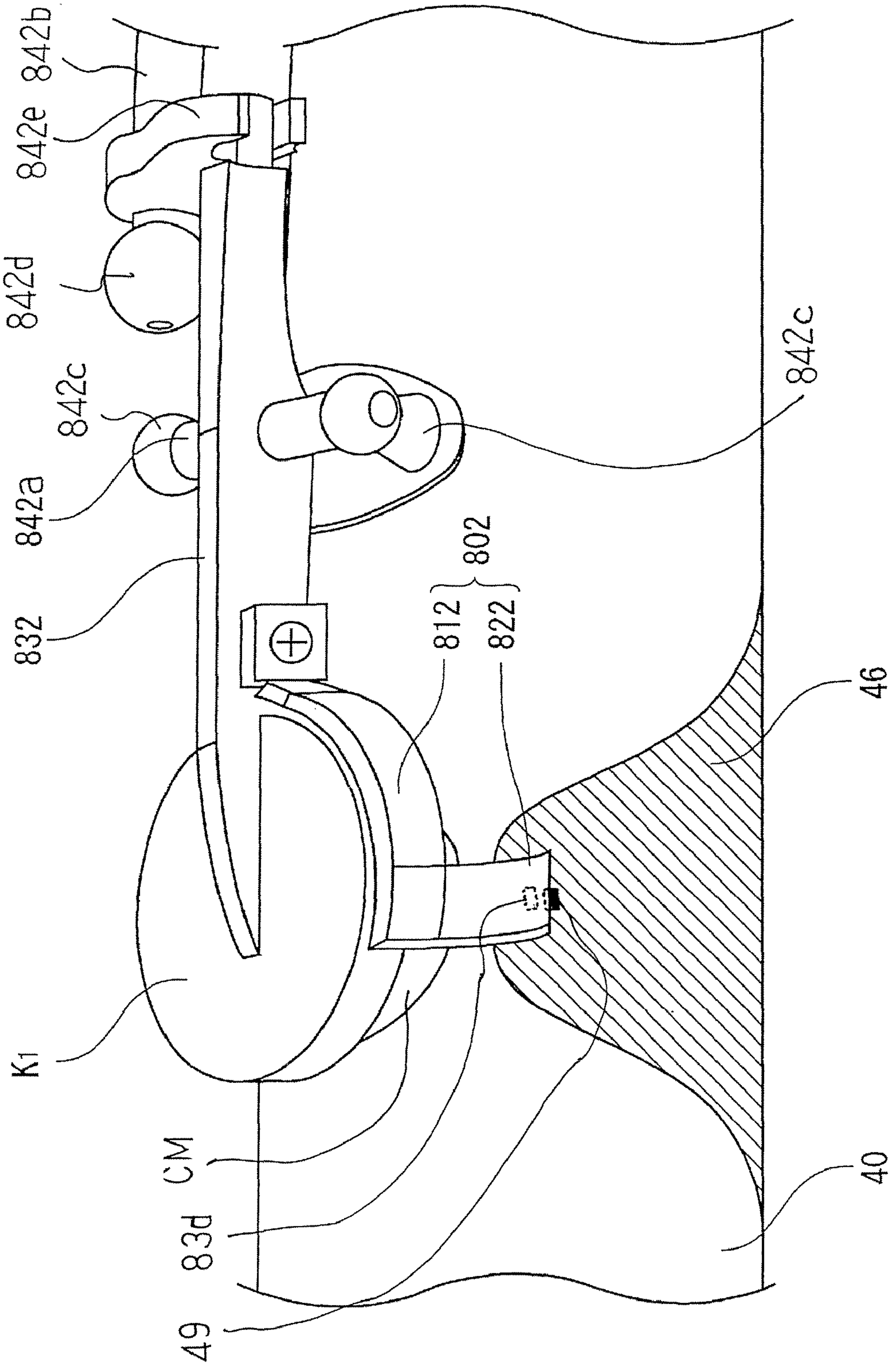
FIG. 9 is a perspective view showing the structure of fourth sort of key sub-mechanism forming still another part of the key mechanism.

FIG. 9 shows the fourth sort of key sub-mechanism incorporated in the key mechanism 10D. The forth sort of key sub-mechanism includes the key K1, arm 832, key rods 842*a* and 842*b*, posts 842*c* and 842*d*, connector 842*e* and lever (not shown). The key K1 is connected to one end portion of the arm 832, and the key rod 842 is rotatably supported by the body 40 by means of the posts 842*a*. The arm 832 is arranged in such a manner as to extend on both sides of the key rod 842, and is secured to the key rod 842. The arm 832 and, accordingly, key K1 are rotated about the center axis of key rod 842*a*, and the tone hole, which is defined by the tone hole chimney CM, is opened and closed with the key K1. The other key rod 842*b* extends in a direction parallel to the key rod 832, and is rotatably supported by the posts 842*d*, and the key rod 842*b* is connected to the other end portion of the arm 832 by means of the connector 842*e*.

The lever (not shown) is remote from the key K1, and is linked with the key rod 842*b*. When the player depresses and releases the lever (not shown), the lever (not shown) gives rise to the rotation of key rod 842*b*, and the connector 842*e* pushes down and up the other end portion of the arm 832. As a result, the key K1 is spaced from and brought into contact with the tone hole chimney CM.

In the fourth sort of key sub-mechanism, the key K1 is still another suitable component part. However, the tone hole chimney CM occupies space below the key K1. For this reason, the flexible circuit board 46 does not invade the space. Moreover, the tone hole chimney CM makes the key K1 widely spaced from the flexible circuit board 46.

The driven part 802 is bolted to the arm 832, and includes two curved portions 812 and 822. The curved portion 812 extends along the periphery of key K1, and the other curved portion 822 projects from the leading end portion of curved portion 812 toward the flexible circuit board 46. The lower end portion of curved portion 822 is closer to the flexible circuit board 46 than the key K1 is, and reaches space over the flexible circuit board 46. The piece of magnet 83*d* is secured to the curved portion 822, and is opposed to the Hall-effect element 49 on the associated conductive strip of flexible circuit board 46. The driven part 802 is rotated about the center axis of key rod 842*a* together with the key K1 and arm 832 so that the piece of magnet 83*d* gets close to and spaced from the associated Hall-effect element 49. Since the piece of magnet 83*d* is moved in the space close to the Hall-effect element 49, the Hall-effect element 49 makes the potential level on the associated conductive strip widely varied.

Fifth Sort of Key Sub-Mechanism

Figure 10:
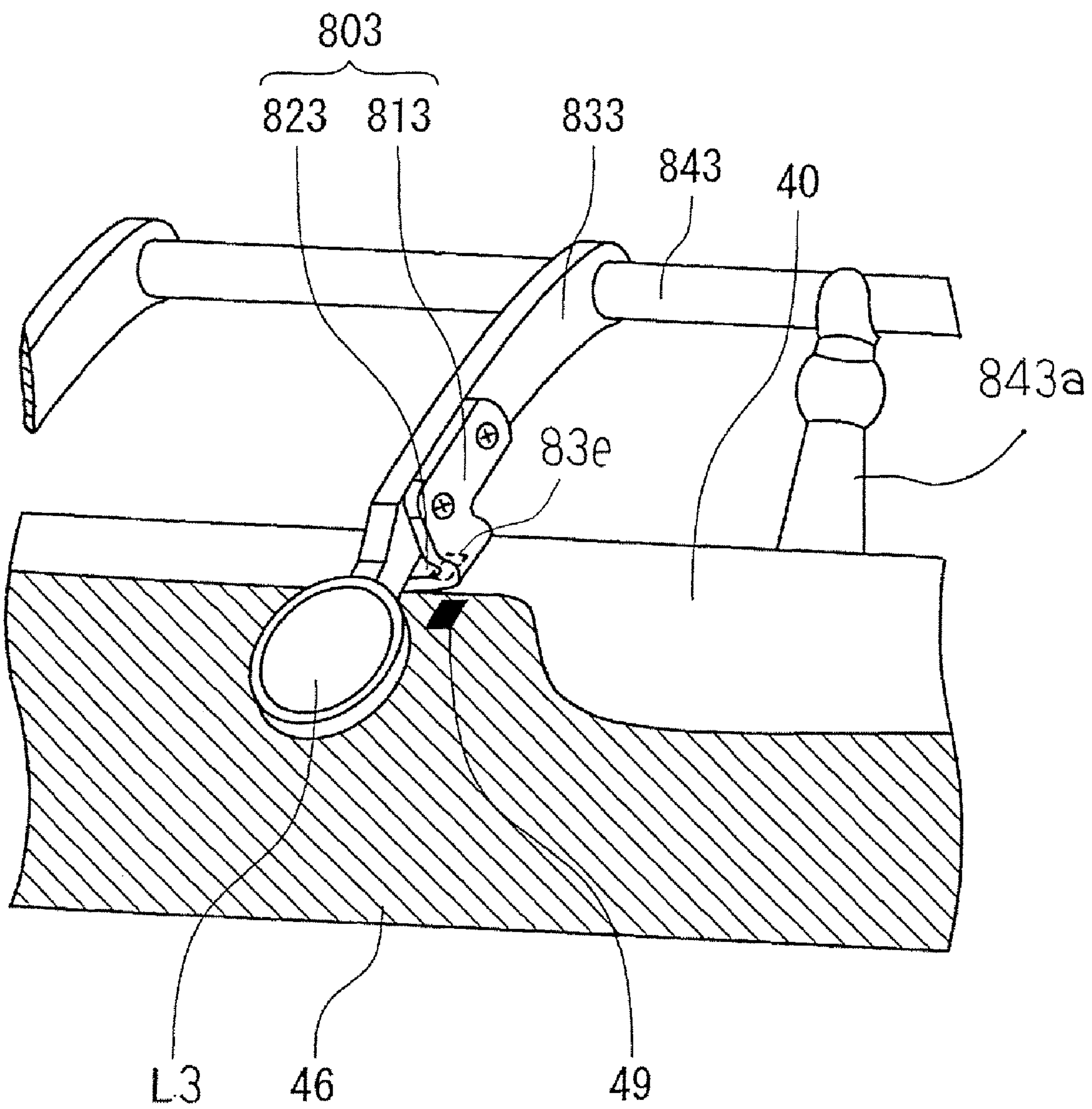
FIG. 10 is a perspective view showing the structure of fifth sort of key sub-mechanism forming yet another part of the key mechanism.

FIG. 10 shows the fifth sort of key sub-mechanism incorporated in the key mechanism 10D. The fifth sort of key sub-mechanism includes the touch-piece L3, arm 833, key rod 843, posts 843*a* and key (not shown). The touch-piece L3 is connected to one end of the arm 833, and the other end of arm 833 is connected to the key rod 843. The key rod 843 is rotatably supported by the body 40 by means of the posts 843*a*, and extends over the body 40 in parallel to the outer surface of body 40. The key rod 843 is linked with the key (not shown), and the player opens and closes the tone hole with the key (not shown) by depressing and releasing the touch-piece L3. The touch-piece L3 serves as yet another suitable component part in the fifth sort of key sub-mechanism.

Although the touch-piece L3 is moved over the flexible circuit board 46, the space around the touch-piece is so narrow that the manufacturer feels it difficult to directly attach the sensor thereto. For this reason, the driven part 803 is bolted to the arm 833.

The driven part 803 has a vertical portion 813 and a horizontal portion 823. The vertical portion 813 project from the side surface of the arm 833 toward the flexible circuit board 46, and the horizontal portion 823 is bent at right angle from the vertical portion 813. The vertical portion 813 makes the horizontal portion 823 closer to the flexible circuit board 46 than the arm 833, and the horizontal portion 823 is opposed to an area where the associated conductive strip extends. The piece of magnet 83*e* is secured to the horizontal portion 823, and is opposed to the Hall-effect element 49 on the associated conductive strip of the flexible circuit board 46.

Since the driven part 803 causes the piece of magnet 83*e* to be moved in the space close to the Hall-effect element 49, the Hall-effect element 49 makes the potential level on the associated conductive strip widely varied. Moreover, although the associated conductive strip does not occupy the area below the suitable component part, i.e., touch-piece L3, the driven part 803 transmits the movement of touch-piece L3 to the piece of magnet 83*e*. Thus, the driven part 803 enhances the design flexibility on the arrangement of conductive strips.

Sixth Sort of Key Sub-Mechanism

Figure 11:
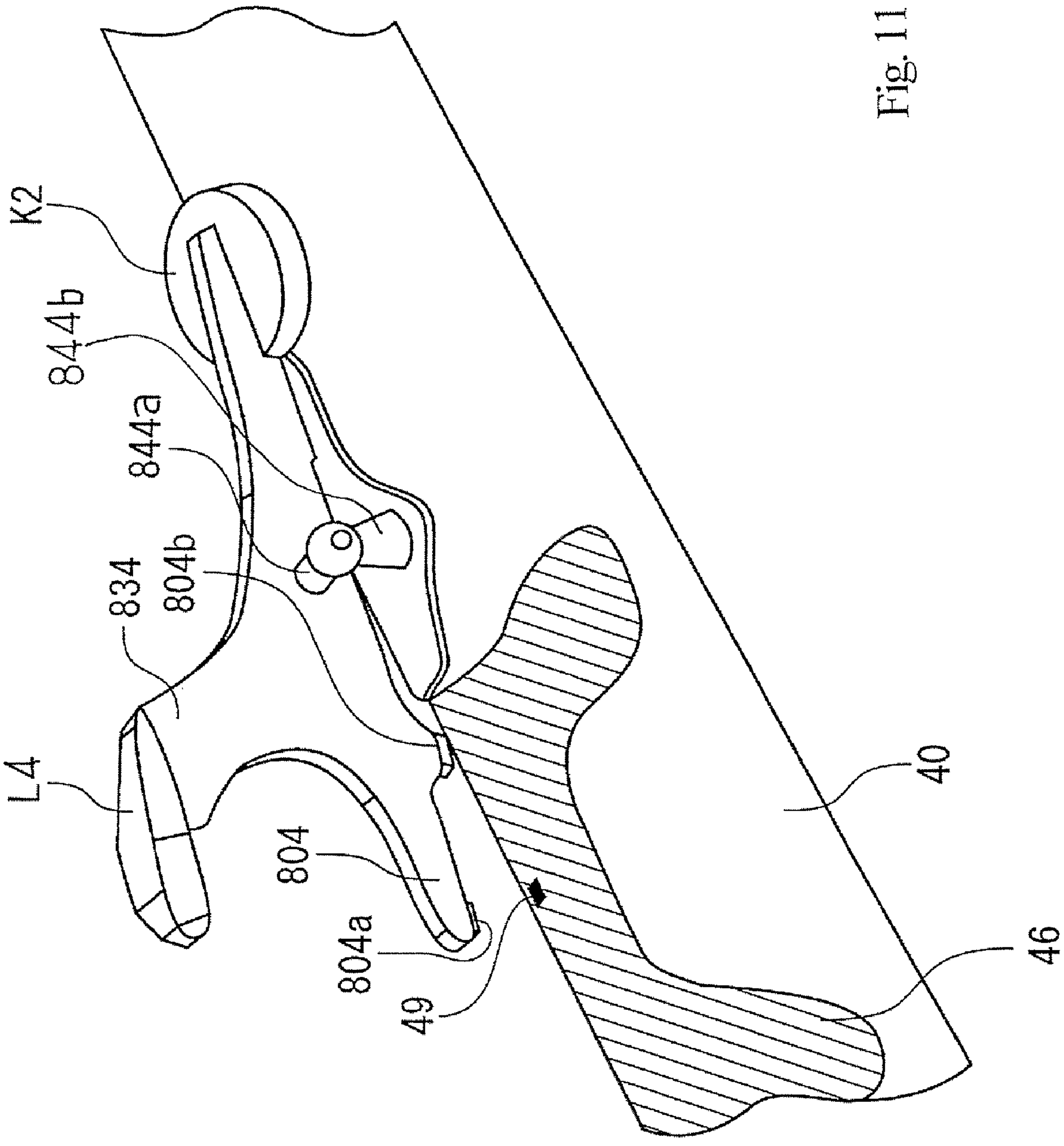
FIG. 11 is a perspective view showing the structure of sixth sort of key sub-mechanism forming still another part of the key mechanism.

FIG. 11 shows the sixth sort of key sub-mechanism incorporated in the key mechanism 10D. The sixth sort of key sub-mechanism includes the lever L4, arm 834, key rod 844*a*, posts 844*b* and key K2. The lever L4 is connected to one end portion of the arm 834, and the key K2 is connected to the other end portion of the arm 834. The key rod 844*a* is connected to a central portion of arm 834, and is rotatably supported by the body 40 by means of the posts 844*b*. When the player depresses and releases the lever L4, the tone hole is opened and closed with the key K2. The lever L4 serves as still another suitable component part. Although the lever L4 has a portion, which is moved in the space over the flexible circuit board 46, the area below the portion is not optimum to move with respect to the key rod 844*a* under the condition that the key K2 is spaced from the key rod 844*a* by the distance shown in FIG. 11. For this reason, the driven part 804 is used for the sixth sort of sub key-mechanism.

The driven part 804 and arm 834 form a unitary component. The driven part 804 projects into space over the area assigned to the associated conductive strip, and extends in parallel to the lever L4. A piece of magnet 804*a* and a piece 804*b* of soft material such as cork are secured to the driven part 804, and the piece of magnet 804*a* is opposed to the associated Hall-effect element 49 on the associated conductive strip of the flexible circuit board 46.

The piece 804*b* of soft material prevents the piece of magnet 804*a* from contact with the Hall-effect element 49. The driven part 804 causes the piece of magnet 804*a* moved in the space close to the Hall-effect element 49, and, for this reason, the Hall-effect element 49 makes the potential level on the associated conductive strip widely varied.

As described hereinbefore, the first sort of key sub-mechanism to sixth sort of key sub-mechanism are incorporated in the key mechanism 10D, and the driven parts 80 and 800 to 804 make the pieces of magnet 83*a* to 83*e* and 804*a* moved in the space closer to the associated Hall-effect elements 49 than the space where the suitable component parts are moved. As a result, the Hall-effect elements 49 make the potential level on the associated conductive strips widely varied. Thus, the touch sensors 46*a* to 46*n* produce the detecting signals S4 to Sn clearly representing the current status of tone holes, i.e., the tones to be produced.

Circuit Configuration of Control Unit 70

Figure 12:
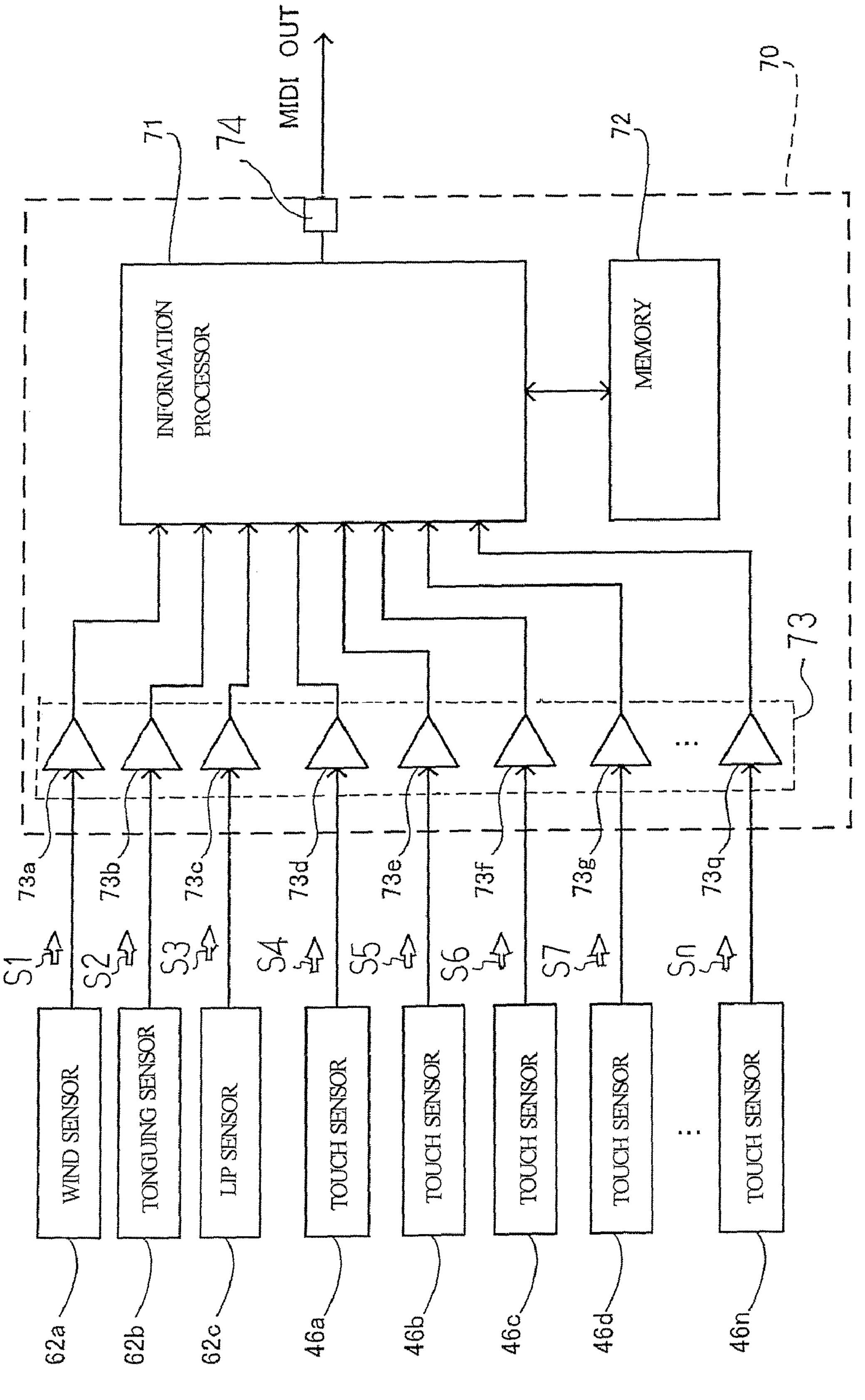
FIG. 12 is a block diagram showing the circuit configuration of a control unit.

Turning to FIG. 12 of the drawings, the control unit 70 includes an information processor 71, a memory 72, a signal interface 73 and a MIDI interface 74. The information processor 71, memory 72, signal interface 73 and MIDI interface 74 are connected to one another through a shared bus system and signal lines formed on a rigid circuit board.

The information processor 71 is an origin of information processing capability of the control unit 70, and memory 72 serves as a program memory and a working memory. A computer program and pieces of data information are stored in the memory 72. While a computer program is running on the information processor 71, the information processor 71 accepts instructions of users, and makes it possible to achieve jobs for producing the electronic tones.

The signal interface 73 includes interface units 73*a*, 73*b*, 73*c*, 73*d*, 73*e*, 73*f*, 73*g*, . . . and 73*q*, to which the sensors 62*a* to 62*c* and 46*a* to 46*n* are connected in parallel. Each of the interface units 73*b* to 73*q* includes a switching transistor and a differential amplifier. The switching transistor is connected between the signal line and one of the input nodes of differential amplifier, and a threshold voltage is applied to the other of the input nodes of differential amplifier. The detecting signal S2, S3, S4, S5, S6, S7, . . . or Sn is applied from each of the sensors 62*b* to 62*c* and 46*a* to 46*n* through the associated switching transistors to the differential amplifiers.

On the other hand, the interface 73*a* includes an amplifier, an analog-to-digital converter and a data buffer. The detecting signal S1, which represents the pressure of breath, is amplified, and discrete values on the detecting signal S1 are converted to corresponding binary numbers. The binary values are stored in the data buffer as a digital detecting signal. The digital detecting signal is representative of a piece of performance data expressing the pressure of breath.

The information processor 71 periodically changes an enable signal to the switching transistors of interfaces 73*b* to 73*q*, and makes the potential level of detecting signals S2 to Sn taken into the other of two input nodes. The potential level of detecting signals is compared with the threshold voltage so that the potential level at the output nodes of the differential amplifiers is rapidly raised to a high level corresponding to binary number "1" or rapidly decayed to a low level corresponding to binary number "0". The binary numbers are stored at the output nodes of differential amplifiers until the information processor 71 changes the enable signal to the active level, again. The binary numbers form a digital detecting signal representative of pieces of performance data. The pieces of performance data is indicative of whether or not the player depresses the touch-pieces 43*a* to 43*h* and levers 44*a* to 44*l* and how the player changes the state of tongue and mouth.

The information processor 71 periodically fetches the digital detecting signals from the interface units 73*a* to 73*q*, and the pieces of performance data are stored in the working memory.

The information processor 71 analyzes the pieces of performance data on the detecting signals S4 to Sn to see what potential level pattern the pieces of performance data express. As described hereinbefore, since the potential level patterns are respectively corresponding to the values of the pitch of electronic tones, the information processor 71 determines the pitch of tone to be produced through the analysis on the pieces of performance data on the detecting signals S4 to Sn.

The information processor 71 further analyzes the piece of performance data carried on the detecting signal S1, and determines the loudness of electronic tones. The information processor further analyzes the pieces of performance data carried on the detecting signals S2 and S3, and determines the timing to generate a tone and timing to decay the tone on the basis of the pieces of performance data. Thus, the information processor 71 determines the attributes of electronic tones to be produced and timings of tone generation.

Thereafter, the information processor 71 produces a music data code expressing the pieces of music data. In this instance, the MIDI (Musical Instrument Digital Interface) protocols are employed for the music data codes. For this reason, the music data codes are output from the MIDI interface 74

Though not shown in the drawings, an electronic tone generator and a sound system are prepared separately from the hybrid musical instrument 10. The music data codes are supplied to the electronic tone generator, and an audio signal is produced from pieces of waveform data on the basis of the music data codes. The audio signal is supplied from the electronic tone generator to the sound system so that the electronic tone is radiated from a headphone and/or loudspeakers of the sound system.

As will be appreciated from the foregoing description, the driven parts 80 and 800 to 804 transmit the movements of suitable component parts of key mechanism 10D to the movable parts of sensors 46*a* to 46*n*, i.e., the pieces of magnet 83*a* to 83*e* and 804*a* so that the appropriate areas are assigned to the stationary parts of sensors 46*a* to 46*n*, i.e., the Hall-effect elements 49 are regardless of the distance from the suitable component parts. Thus, the manufacturer makes it possible to install the sensors 46*a* to 46*n* on the surface of tubular instrument body 10C together with the complicated key mechanism 10D.

Moreover, the driven parts 80 and 800 to 804 permit the manufacturer to gather the stationary parts of sensors 46*a* to 46*n* in a narrow area, i.e., the surface of body 40. As a result, the conductive pattern on the circuit board 46 is simplified, and the detecting signals S4 to Sn are less liable to be decayed because of the short distance between the sensors 46*a* to 46*n* and the control unit 70. In case where the acoustic wind instrument has plural tubular parts such as the bell 20, bow 30, body 40 and neck 50, it is possible to gather the stationary parts of sensors 46*a* to 46*n* on one of the plural tubular parts. As a result, the stationary parts of sensors 46*a* to 46*n* are arranged on the single flexible circuit board 46. The users feel the single flexible circuit board 46 easy to wind around the tubular part.

Although particular embodiments of the present invention have been shown and described, it will be apparent to those skilled in the art that various changes and modifications may be made without departing from the spirit and scope of the present invention.

The single flexible circuit board 46 does not set any limit to the technical scope of the present invention. The touch sensors may directly monitor all the keys of the key mechanism 10D. In this instance, flexible circuit boards are prepared for the bell 20, bow 30, body 40 and neck 50, and are wound on these tubular components 20, 30, 40 and 50. Similarly, touch sensors may directly monitor all of the levers and touch-pieces, and plural flexible circuit boards are prepared for the tubular components.

The alto saxophone does not set any limit to the technical scope of the present invention. The electric system 10B may be installed on a curved soprano saxophone, a tenor saxophone or a baritone saxophone is available for the hybrid wind instrument of the present invention. Moreover, the electric system may be installed on another sort of wind musical instrument with a key mechanism such as, for example, a clarinet, a piccolo, a flute, an oboe and a faggot.

The MIDI protocols do not set any limit to the technical scope of the present invention. Various sorts of music data protocols have been proposed. Any one of those sorts of music data protocols is employable for the hybrid musical instruments of the present invention.

A control unit, which forms a part of the electric system for the hybrid wind musical instrument, may simply output the detecting signals S1 to Sn to an external information processing system through a cable or a radio communication channel.

An electronic tone generator and a sound system may be provided in the control unit 70 together with the circuit components shown in FIG. 12.

The driven parts 80 and 800 to 804 do not set any limit to the technical scope of the present invention. One of the driven parts 80 and 800 to 804 may be replaced with another driven part fitted to the key rod or arm. A driven part fitted to a certain key rod may extend over other component part or parts of key mechanism so as to transmit the certain key rod to wide space remote from the certain key rod.

Hybrid wind musical instruments of the present invention are not always equipped with all the first sort of key sub-mechanism to sixth sort of key sub-mechanisms. Only one sort of key sub-mechanism may be incorporated in the key mechanism of a hybrid wind musical instrument.

The combination of the piece of magnet and Hall-effect element does not set any limit to the technical scope of the present invention. An optical sensor is, by way of example, available for the touch sensors. The optical sensor may be implemented by a combination of an optical modulator fitted to the driven part and a transmission type photo coupler. The combination may be replaced with another combination of a reflection plate and a photo reflector.

A contact type sensor is available for the sensors. The contact type sensor may be implemented by a resiliently deformable plate and a pressure sensor. The resiliently deformable plate is fitted to the suitable component part of key mechanism, and is held in contact with the pressure sensor so as to make the pressure on the pressure sensor varied depending upon the current position of the suitable component part.

The acoustic mouthpiece 60 and electronic mouthpiece 65 may be replaced with a mouthpiece. The mouthpiece is formed with an air passage bifurcated into two branches. The reed is exposed to one of the branches, which is connectable to the vibratory column of air, and the orifice is exposed to another branch, which is open to the atmosphere. A valve is provided for selecting one of the branches.

The flexible circuit board 46 may provided on a surface of another tubular part such as, the bell 20, bow 30 or neck 50. Thus, the body 40 does not set any limit to the technical scope of the present invention.

The control unit 70 may be separated from the tubular instrument body 10C. In this instance, the detecting signals S1 to Sn are transferred from the sensors 62*a* to 62*c* and 46*a* to 46*n* to the control unit 70 through a cable.

The electric system may be delivered to users. The users retrofit their acoustic wind instruments to the hybrid wind musical instruments of the pre-sent invention by combining the electric system with the acoustic wind musical instruments.

The component parts of hybrid wind musical instrument are correlated with claim languages as follows.

The tubular instrument body 10C and key mechanism 10D are also referred to as a "tubular instrument body" and a "key mechanism", respectively, and the acoustic mouthpiece 60 and electronic mouthpiece 65 as a whole constitute a "wind inlet piece". The touch sensors 46*a* to 46*n* serve as "first sensors", and the wind sensor 62*a*, tonguing sensor 62*b* and lip sensor 62*c* are corresponding to "second sensors". The detecting signals S4 to Sn are corresponding to "first detecting signals", and the detecting signals S1, S2 and S3 are corresponding to "second detecting signals". The pieces of magnet 83*a* to 83*e* and 804*a* serve as "movable parts", and the Hall-effect elements 49 serve as "stationary parts". The MIDI music data codes are corresponding to an "electric signal".

The levers 44*a* to 44*l*, L0, L1 and L4 and touch-pieces 43*a* to 43*h*, L2 and L3 serve as "lingered parts", and the keys 20*a*, 20*b*, 30*a*, 30*b*, 40*a*, 40*b*, 40*c*, K0, K1 and K2 serve as "action parts". The key rods 21*b*, 31*a*, 41*a*, 41*c*, 840, 841, 842, 843 and 844 and the arms 22*b*, 32*a*, 42*a*, 42*c*, 45*c*, 45*d*, 830, 831, 832, 833 and 834 serve as "transmitting parts".

The flexible circuit board 46 is corresponding to a "flexible circuit board", and the bell 20, bow 30, body 40 and neck 50 are corresponding to "plural tubular parts".

What is claimed is:

1. A hybrid wind musical instrument for selectively producing acoustic tones and electric tones, comprising:

a tubular instrument body defining a vibratory column of air therein;

a wind inlet piece connected to said tubular instrument body, and blown by a player for vibrations of said vibratory column of air;

a key mechanism provided on a surface of said tubular instrument body, and including plural component parts selectively driven by said player for specifying a pitch of said acoustic tones and a pitch of said electric tones; and an electric system including first sensors monitoring movements of selected ones of said plural component parts and having respective movable parts and respective stationary parts so as to produce first detecting signals representative of pieces of performance data through relative motion between said movable parts and said stationary parts, second sensors monitoring the blow into said wind inlet piece for producing second detecting signals representative of other pieces of performance data, driven parts connected to said selected ones of said component parts and retaining said movable parts so that said movable parts are moved in the vicinity of said stationary parts, and a control unit connected to said first sensors and said second sensors for producing an electric signal representative of said electric tones to be produced on the basis of said pieces of performance data and said other pieces of performance data.

2. The hybrid wind musical instrument as set forth in claim 1, in which said key mechanism includes fingered parts directly manipulated by said player, action parts working on said tubular instrument body so as to change said pitch and transmitting parts selectively provided between said fingered parts and said action parts so as to transmit force exerted on said fingered parts to said action parts, wherein said fingered parts, said action parts and said transmitting parts serve as said component parts.

3. The hybrid wind musical instrument as set forth in claim 2, in which selected ones of said first sensors are provided for selected ones of said fingered parts.

4. The hybrid wind musical instrument as set forth in claim 2, in which selected ones of said first sensors are provided for selected ones of said action parts.

5. The hybrid wind musical instrument as set forth in claim 1, in which said electric system further includes a flexible circuit board wound on said tubular instrument body, wherein said stationary parts are mounted on said flexible circuit board.

6. The hybrid wind musical instrument as set forth in claim 5, in which said tubular instrument body is separable into plural tubular parts, wherein said flexible circuit board is wound on one of said plural tubular parts.

7. The hybrid wind musical instrument as set forth in claim 5, in which said flexible circuit board has a periphery spaced from at least one of said selected ones of said component parts, wherein one of said driven parts extends over gap between said periphery and said at least one of said selected ones of said component parts so as to penetrate into an area of said flexible circuit board.

8. The hybrid wind musical instrument as set forth in claim 5, in which one of said selected ones of said component parts is spaced from an area of said flexible circuit board in a direction normal to said area, wherein one of said driven parts extends in said direction so as to keep said movable part in the vicinity of said stationary part on said area.

9. The hybrid wind musical instrument as set forth in claim 1, in which said first sensors are of the type electromagnetically converting said movements of said selected ones of said component parts to said first detecting signals.

10. The hybrid wind musical instrument as set forth in claim 9, in which each of said first sensors has a piece of magnet serving as one of said movable parts, and a Hall-effect element serving as one of said stationary parts.

11. An electric system for a hybrid wind musical instrument including a tubular instrument body, a wind inlet piece and a key mechanism, comprising:

first sensors monitoring movements of selected ones of component parts of said key mechanism, and having respective movable parts and respective stationary parts so as to produce first detecting signals representative of pieces of performance data through relative motion between said movable parts and said stationary parts;

second sensors monitoring blow into said wind inlet piece for producing second detecting signals representative of other pieces of performance data;

driven parts connected to said selected ones of said component parts, and retaining said movable parts so that said movable parts are moved in the vicinity of said stationary parts; and a control unit connected to said first sensors and said second sensors for producing an electric signal representative of said electric tones to be produced on the basis of said pieces of performance data and said other pieces of performance data.

12. The electric system as set forth in claim 11, in which said key mechanism includes fingered parts directly manipulated by said player, action parts working on said tubular instrument body so as to change said pitch and transmitting parts selectively provided between said fingered parts and said action parts so as to transmit force exerted on said fingered parts to said action parts, wherein said fingered parts, said action parts and said transmitting parts serve as said component parts.

13. The electric system as set forth in claim 12, in which selected ones of said first sensors are provided for selected ones of said fingered parts.

14. The electric system as set forth in claim 12, in which selected ones of said first sensors are provided for selected ones of said action parts.

15. The electric system as set forth in claim 11, in which said electric system further includes a flexible circuit board wound on said tubular instrument body, wherein said stationary parts are mounted on said flexible circuit board.

16. The electric system as set forth in claim 15, in which said tubular instrument body is separable into plural tubular parts, wherein said flexible circuit board is wound on one of said plural tubular parts.

17. The electric system as set forth in claim 15, in which said flexible circuit board has a periphery spaced from at least one of said selected ones of said component parts, wherein one of said driven parts extends over gap between said periphery and said at least one of said selected ones of said component parts so as to penetrate into an area of said flexible circuit board.

18. The electric system as set forth in claim 15, in which one of said selected ones of said component parts is spaced from an area of said flexible circuit board in a direction normal to said area, wherein one of said driven parts extends in said direction so as to keep said movable part in the vicinity of said stationary part on said area.

19. The electric system as set forth in claim 11, in which said first sensors are of the type electromagnetically converting said movements of said selected ones of said component parts to said first detecting signals.

20. The electric system as set forth in claim 19, in which each of said first sensors has a piece of magnet serving as one of said movable parts, and a Hall-effect element serving as one of said stationary parts.

* * * * *